United States Patent [19]

Peterson

[11] Patent Number: 5,355,060
[45] Date of Patent: Oct. 11, 1994

[54] LOAD IMPACT CONTROLLER FOR A SPEED REGULATOR SYSTEM

[75] Inventor: Robert S. Peterson, Pittsburgh, Pa.

[73] Assignee: AEG Automation Systems Corporation, Pittsburgh, Pa.

[21] Appl. No.: 867,098

[22] PCT Filed: Oct. 24, 1990

[86] PCT No.: PCT/US90/06112

§ 371 Date: Aug. 14, 1992

§ 102(e) Date: Aug. 14, 1992

[87] PCT Pub. No.: WO92/08275

PCT Pub. Date: May 14, 1992

[51] Int. Cl.$^5$ ............................................... H02P 5/00
[52] U.S. Cl. .................................... 318/432; 318/434; 318/609; 388/800; 388/811
[58] Field of Search ............... 318/561, 569, 609, 610, 318/611, 615, 619, 623, 632, 432, 433, 434, 114; 388/800, 801, 802, 809, 811

[56] References Cited

U.S. PATENT DOCUMENTS 3,775,653 11/1973 Peterson et al. .
3,807,208 4/1974 Hensleigh .
3,983,464 9/1976 Peterson .
4,047,080 9/1977 Peterson .
4,162,624 7/1979 Morooka et al. .
4,556,830 12/1985 Schwalm .
4,565,952 1/1986 Kaiko .
4,700,312 10/1987 Kikuma .
4,839,573 6/1989 Wise .
4,905,491 3/1990 Starke .

Primary Examiner—Bentsu Ro
Attorney, Agent, or Firm—R. V. Westerhoff

[57] ABSTRACT

An impact load controller (28) compensates for the speed drop of a drive motor (12), which speed drop is caused by a load disturbance applied to the drive motor (12). A change in the dynamics of a speed controller (30, 34) in a speed regulator system for a stand in a tandem rolling mill is initiated by detecting a speed error (WE) which is greater than a predetermined speed error value and is removed after the speed error has been reduced to a predetermined value. The controller (28) is a pure rate controller whose input is converted into a rate change in speed error, which is multiplied by a gain factor. The resultant gain value product is initially increased by a predetermined factor to provide a high input signal to the (PI) speed controller (34) of a multi-loop speed regulator system for the drive motor (12), and to precharge a low pass filter. Thereafter, the output of the impact load controller (28) is a function of the time constant of the low pass filter; whereby the product gain consisting of the rate of change in speed error decays exponentially. The load impact controller (28) can be either a microprocessor type of control arrangement or an analog type of control arrangement.

41 Claims, 21 Drawing Sheets

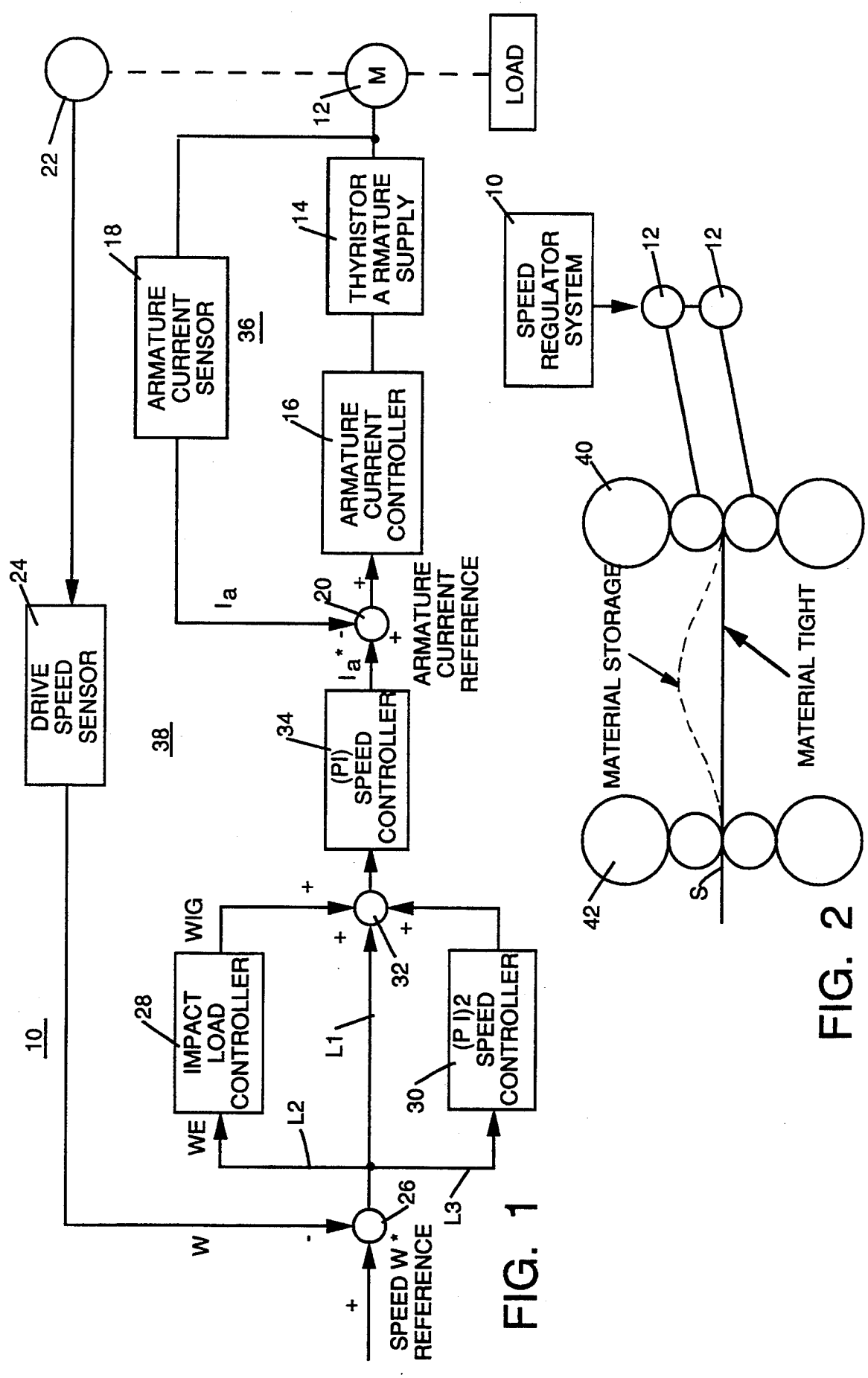

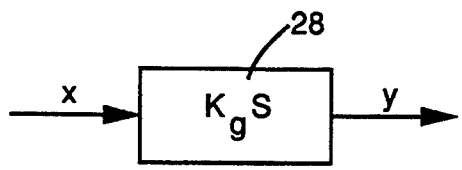

IMPACT LOAD CONTROLLER
TRANSFER FUNCTION

WHERE
    X = INPUT
    Y = OUTPUT
    $K_g$ = GAIN

S = LAPLACE OPERATOR, 1 / SEC.

$$\text{LET } S = \frac{1 - Z^{-1}}{T_d} \; ; \; Z^{-1} = e^{-T_d S}$$

$T_d$ = UPDATE TIME OF DIGITAL CONTROLLER, MILLISECONDS $$\frac{Y}{X} = K_g(S) = K_g \left( \frac{1 - Z^{-1}}{T_d} \right)$$

$$Y = X(1 - Z^{-1}) \left( \frac{K_g}{T_d} \right)$$

$K_g$    LET $\frac{K_g}{T_d}$ = GOOSE GAIN

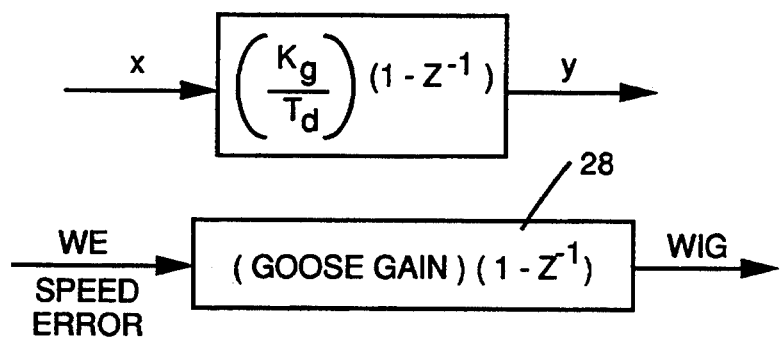

IMPACT LOAD DIGITAL CONTROLLER
TRANSFER FUNCTION

FIG. 4

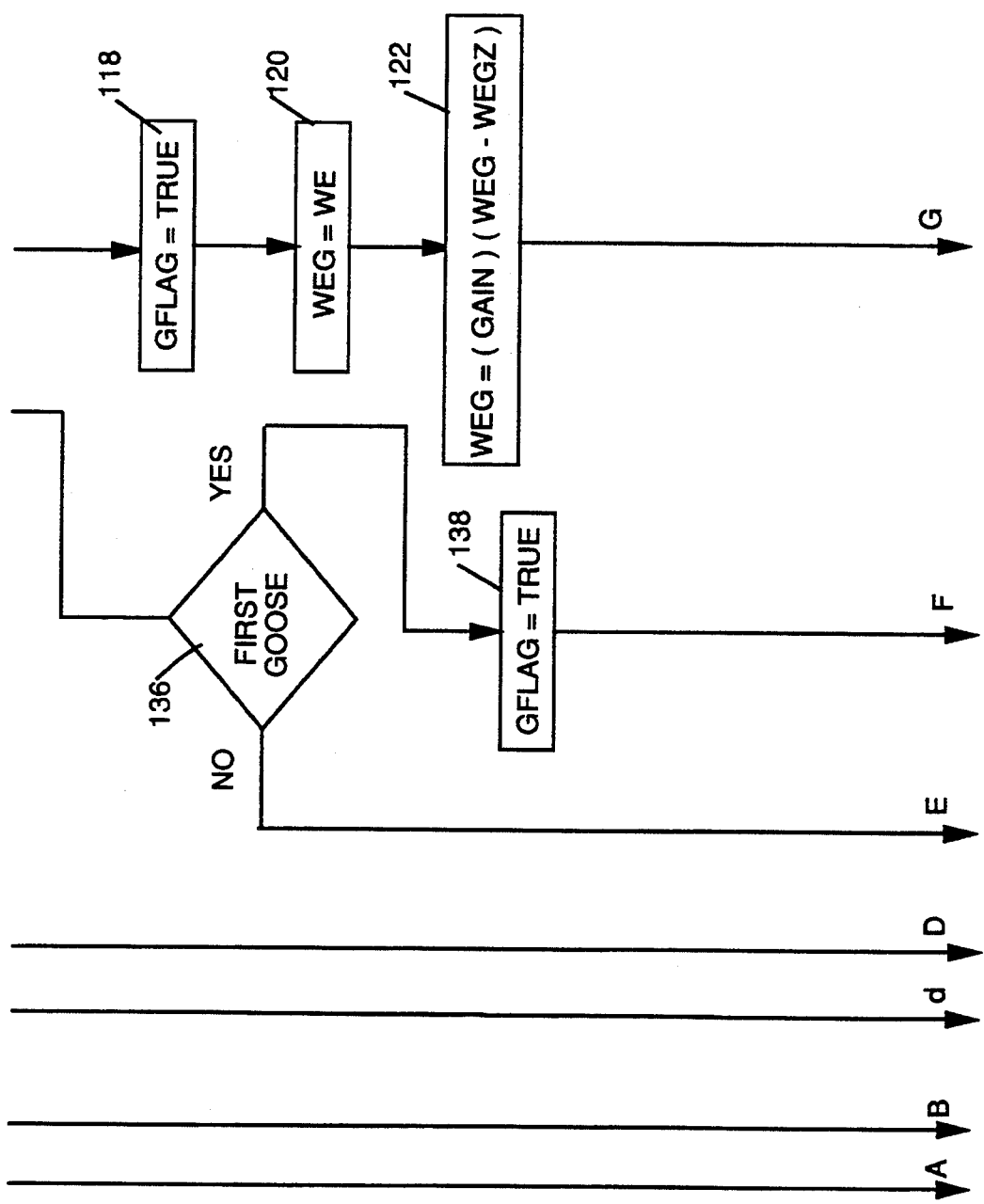

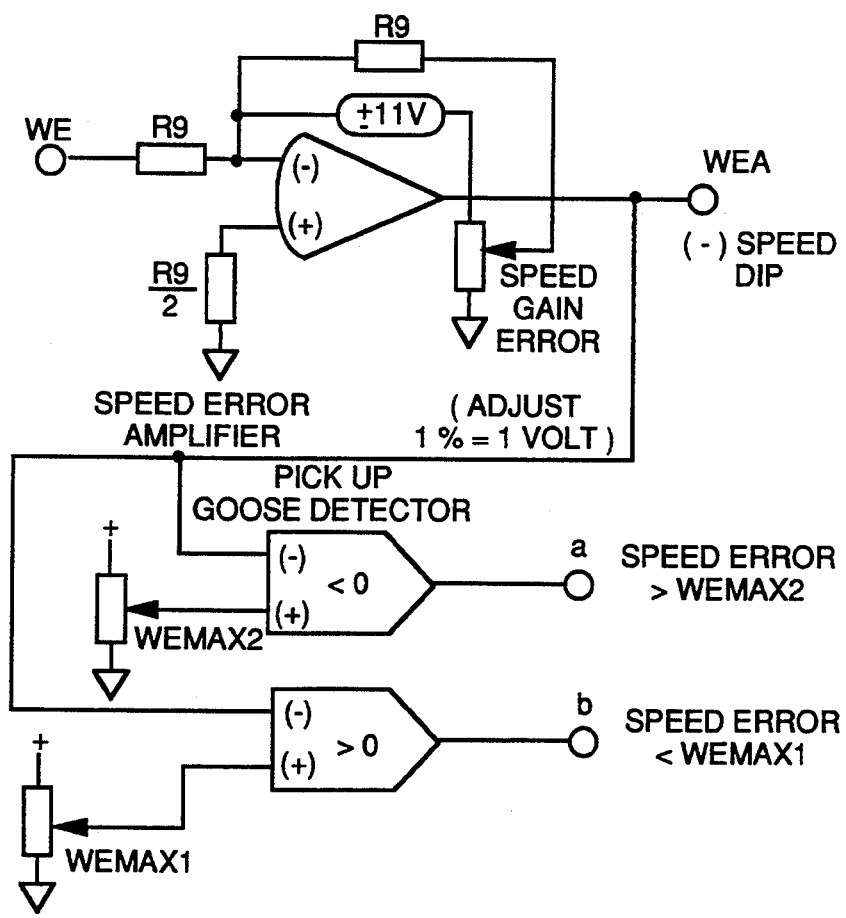

$$\frac{WEG}{WE} = -\frac{\left(\frac{C_1 R_2}{\alpha}\right) S}{1 + R_1 C_1 S} \quad ; \quad \text{GOOSE RATE CONTROLLER TRANSFER FUNCTION}$$

$$\frac{WIG}{WEG} = -\left(\frac{R_4}{R_5}\right)\left[\frac{1}{1 + (r) R_4 C_4 S}\right] \quad ; \quad \text{GOOSE LOW PASS FILTER TRANSFER FUNCTION}$$

$$\frac{WIGF}{WEG} = \frac{1}{\beta} \quad ; \quad \text{GOOSE FIRST GAIN AMPLIFIER TRANSFER FUNCTION}$$

$$\frac{WPIZ}{WE} = \frac{1}{(\gamma) R_6 C_6 S} \quad ; \quad (PI)^2 \text{ INTEGRATOR TRANSFER FUNCTION}$$

$$\frac{I^*}{WE} = \frac{1 + R_7 C_7 S}{(\rho) R_8 C_7 S} \quad ; \quad \text{NORMAL SPEED (PI) CONTROLLER TRANSFER FUNCTION}$$

NOTE : S = LAPLACE OPERATOR , 1 / SECONDS.

FIG. 16

LOAD IMPACT CONTROLLER FOR A SPEED REGULATOR SYSTEM

BACKGROUND OF THE INVENTION

1. Field of the Invention

This invention relates to a speed regulator system for a d.c. motor, and more specifically to an impact load controller for use with a speed controller of such a system.

2. Description of the Prior Art

In the threading stage of a hot or cold tandem rolling mill for rolling material, such as a steel strip, the strip passes through several stands of the mill. The entry of the strip into the roll bite of the stand causes an impact load torque to be applied to the drive motors of the work rolls which are pulling the strip through the roll bite. When this load is applied to the speed regulator system, the drive speed suddenly drops. Any drop in drive speed of the stand which is being threaded will cause the strip to gather or buckle between the stand being threaded and the previous stand from which the strip has exited. The increase in strip storage will result in reduction or loss in the tension in the strip between the two stands in which the strip is being threaded. This loss in interstand tension in the strip is a serious operational problem for the mill, forcing the mill operator to manually operate the controls to change the drive speed of the stand or stands for the threading operation.

This manual operation of the controls sometimes results in an excessive increase in the drive speed and thus, an excessive removal of strip storage between the stands, resulting in strip breakage.

It is not only important that the drive speed of the stand in which the strip is being threaded speed recover as fast as possible, but also to overshoot a safe amount to quickly remove the strip storage between the stands caused by the speed drop due to the load impact to the drive motor without causing breakage to the strip.

Previous attempts may have been made to compensate for this impact load disturbance applied to a speed regulator drive system of a mill resulting in a speed drop of the drive motor. However, none of these systems have achieved this compensation in the same manner and with the same efficiency provided by the present invention.

The present invention uses an impact load controller which operates on the rate of change in speed error to first cause the stand speed to overshoot within safe limits and then to quickly bring this overshoot speed down to the threading speed or reference speed setting of the mill.

SUMMARY OF THE INVENTION

This invention employs an impact load controller used with a (PI) speed controller in a speed regulator system for a drive motor and is used for compensating for the speed drop caused by a load disturbance applied to the motor.

This is accomplished by providing an impact load controller which has a means and a method for determining the difference between the present speed error and the previous speed error, which speed errors are continually being updated. This difference in the speed error values is multiplied by "Goose Gain" factor to produce a gain value. This gain value product is initially increased by a rate factor, which signal is initially applied to a low pass filter for precharging the low pass filter and to a summer device for operating the (PI) speed controller used in the speed regulator system. After a few milliseconds, the gain value product of the impact load controller is changed due, in part, to the updated values of the present speed error and the previous speed error. The new gain value product passes directly to the low pass filter. The output from the low pass filter is combined with the speed error signal and optionally with an output of a $(PI)^2$ speed controller which also operates on the speed error signal for an output signal from a summer device. This output from the summer device is produced for a desired time period, for example, two (2) seconds after the strip has entered the roll bite, to operate the (PI) speed controller. At this time, the impact load controller and the $(PI)^2$ speed controller are turned off, whereby the (PI) speed controller resumes its normal operation by operating solely on the speed error signal.

This control arrangement for the impact load controller of the invention may be a digital based microprocessor or an analog type of control system. As applied to a speed controller for a rolling mill, for example, the impact load controller operates on a "strip in stand" logic signal, and is part of the main logic control for the mill. The conditions which must be meet for operation of the logic system differ for a cold mill and a hot mill.

It is, therefore, a broad object of the present invention to provide a means and method for quickly and efficiently compensating for speed drop of a drive motor caused by an impact load applied to the motor.

It is a further object of the present invention to provide a means and method for automatically compensating for speed drop of a drive motor of a mill stand caused by an impact load when a workpiece initially enters the roll bite of a stand during the threading phase of the mill.

It is still a further object of the present invention to provide a means and method for compensating for speed drop by rapidly recovering the speed with sufficient overshoot which does not result in breakage of the workpiece.

A still further object of the present invention is to provide an impact load controller which may be a microprocessor or an analog type control optionally used with a $(PI)^2$ speed controller, and which impact load controller is operated for only a few seconds after the workpiece is in the mill stand.

A still further object of the present invention is to provide a means and method for changing the dynamics of a (PI) speed controller to reduce the effect of an impact load disturbance on the response of a speed regulator system.

A still further object of the present invention is to provide an impact load controller whose output is a function of the rate of change in the speed error, whereby this rate of change in speed error is a direct function of the magnitude of the impact load torque disturbance applied to the drive motor, that is, the greater the load, the greater the output signal of the impact load controller.

It is a still further object of the present invention to provide a means and method of producing a supplemental signal which is a function of the rate of change in speed error and which is combined with an error signal and, optionally, with an output signal of a $(PI)^2$ speed controller to control a (PI) speed controller for regulation of a drive motor.

It is a further object of the present invention to provide an impact load controller which is self-adapting to varying impact loads, thereby providing optimum reduction in the speed error for a drive motor.

These and other objects of the present invention will be more fully understood from the following description of the invention, on reference to the illustrations appended thereto.

BRIEF DESCRIPTION OF THE DRAWINGS

FIG. 1 is a block diagram of a multiloop speed regulator system for a drive motor incorporating the present invention;

FIG. 2 is a schematic showing of two stands of a tandem rolling mill illustrating the material storage problem which is solved by the present invention;

FIG. 4 illustrates the derivation of the rate dynamics for the transfer function of the impact load controller of the invention;

FIGS. 8A, 8B, 9A, 9B, 10A, 10B, 11A, and 11B are flow charts for the impact load controller of the invention;

FIG. 16 is a schematic diagram of the speed error detectors and the transfer functions for the analog control of FIGS. 15A and 15B.

DETAILED DESCRIPTION OF THE PREFERRED EMBODIMENTS

Figure 3:
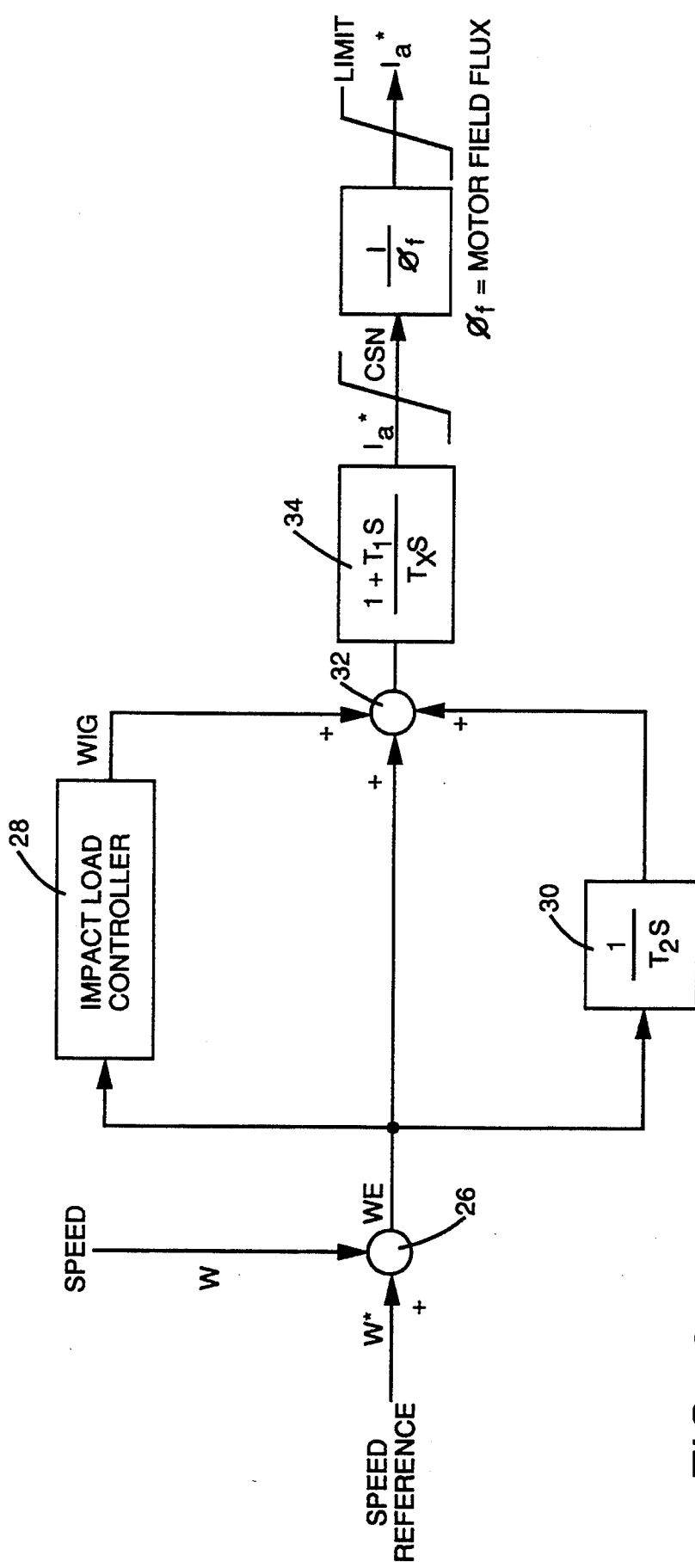
FIG. 3 is a detailed block diagram showing the invention and some of the components of FIG. 1.

FIG. 1 illustrates a simple schematic of a speed regulator system 10 for operating a direct current drive motor 12 connected to be energized by a thyristor armature supply (TAS) 14 in response to an armature voltage reference signal from an armature current controller 16, which may have (PI) characteristics. An armature current sensor 18 provides an actual current negative feedback signal to a summer device 20. Summer device 20 generates an armature current error signal which is the difference between an armature reference between an armature reference current Ia* and the actual current Ia.

The speed of drive motor 12 is detected by a digital tachometer 22 whose output is converted into a desired voltage by drive speed sensor 24. The output from sensor 24 is a feedback signal W, which is negative, and is fed to a summer device 26, which also receives a desired motor speed reference W*, which is positive. The output from summer device 26 is a speed error signal WE.

During the normal operation of the system for the drive system of FIG. 1, the speed error WE is used to control the normal speed controller for the system. For the invention, this speed error signal WE is used as simultaneous input to impact load controller 28, (PI)$^2$ integrator 30, and summer device 32. These three inputs to summer device 32 are positive. The invention involves impact load controller 28.

For an operation of a preferred embodiment of the invention, the speed error WE signal is directed along line L$_1$, to summer device 32, and along lines L$_2$ and L$_3$ to impact load controller 28 and (PI)$^2$ speed controller, respectively. If (PI)$^2$ speed controller is not used, then the WE signal is directed only along lines L$_1$ and L$_2$. When the invention is not operating, i.e. the impact load controller 28 is turned off, then preferably (PI)$^2$ speed controller 30 is also turned off, and the WE signal only goes to summer device 32 for operation of (PI) speed controller 34. The (PI) speed controller 34 is normally used for the operation of drive motor 12.

An example of a speed controller 30 having (PI)$^2$ characteristics can be found in U.S. Pat. No. 3,775,653 which issued on Nov. 27, 1973 to the same inventor as the present invention. In this U.S. Pat. No. 3,775,653 a speed controller with (PI) characteristics is also discussed. In view of this, both speed controllers 30 and 34 in the invention are well-known in the art, and therefore, little or no further discussion with regard to these components is necessary for a complete understanding of the invention.

Also, as is known in the art, the block diagram of FIG. 1 is a multiloop speed regulator system with components 14, 16, 18, and 20 comprising inner current loop 36, and with components 24, 26, 28, 30, 32, and 34 comprising outer speed control loop 38. FIG. 1 shows a simplified version for the current loop, however, it is to be noted that the system in U.S. Pat. No. 3,950,684 which issued on Apr. 13, 1976 to the present inventor can be used. This system includes a current reference ramp function generator. Also, the system of U.S. Pat. No. 3,983,464 issuing on Sep. 28, 1976 can be used with obvious modifications to include the invention.

FIG. 2 shows the speed regulator system 10 of FIG. 1 which drives d.c. drive motors 12 which, in turn, drive the work rolls in a downstand stand 40 of a tandem mill. This FIG. 2 illustrates the problem occurring in a strip S when the strip leaves stand 42 and enters the roll bite of stand 40. When an impact load is applied to stand 40, the speed of the work rolls in stand 40 is decreased, and the strip gathers between stands 40 and 42. The dashed lines indicate that the strip is being stored between stands 40 and 42, and the solid line represents a taut strip between the two stands 40 and 42.

Figure 5:
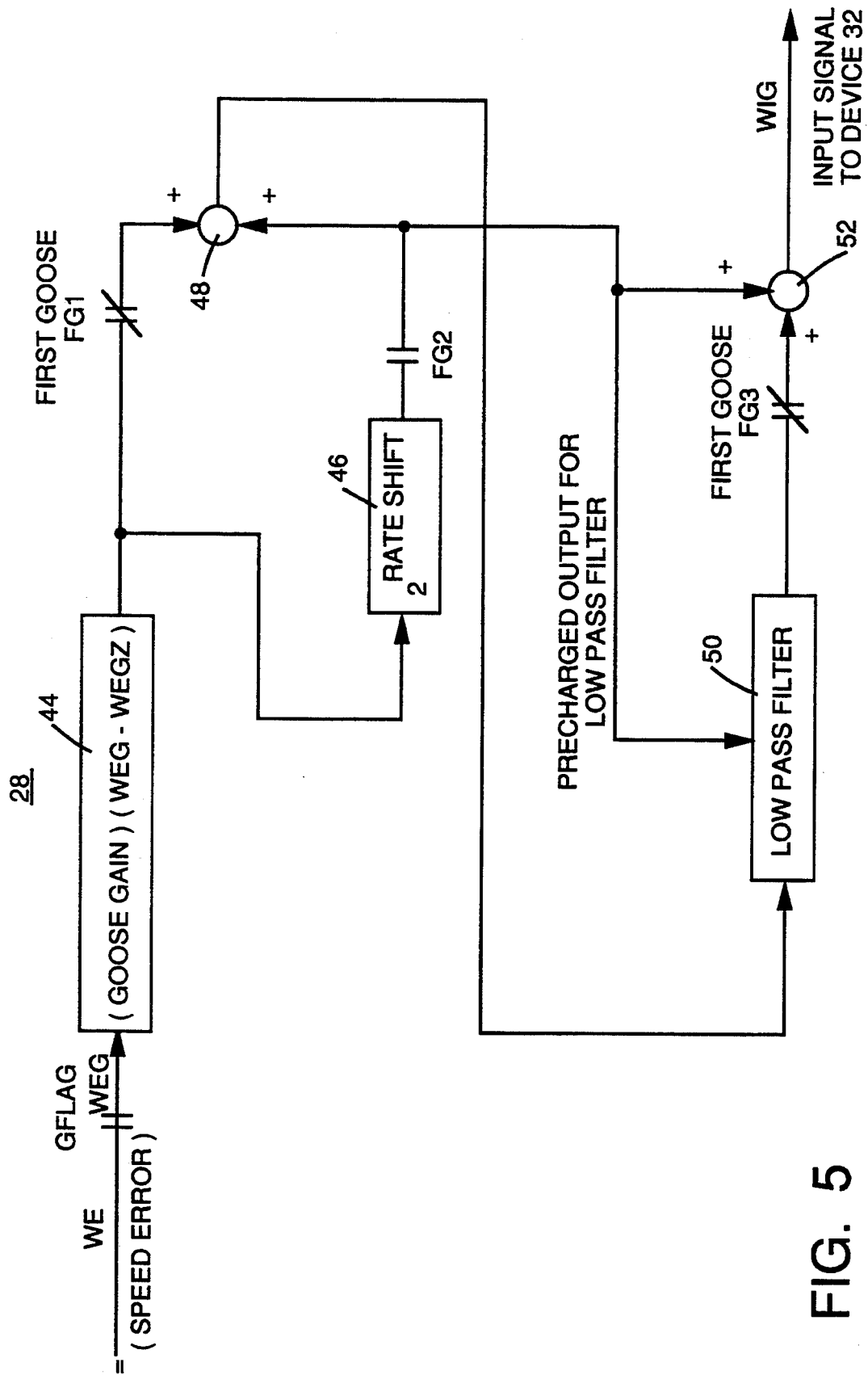
FIG. 5 shows a software diagram of the impact load controller of the present invention.
Figure 6:
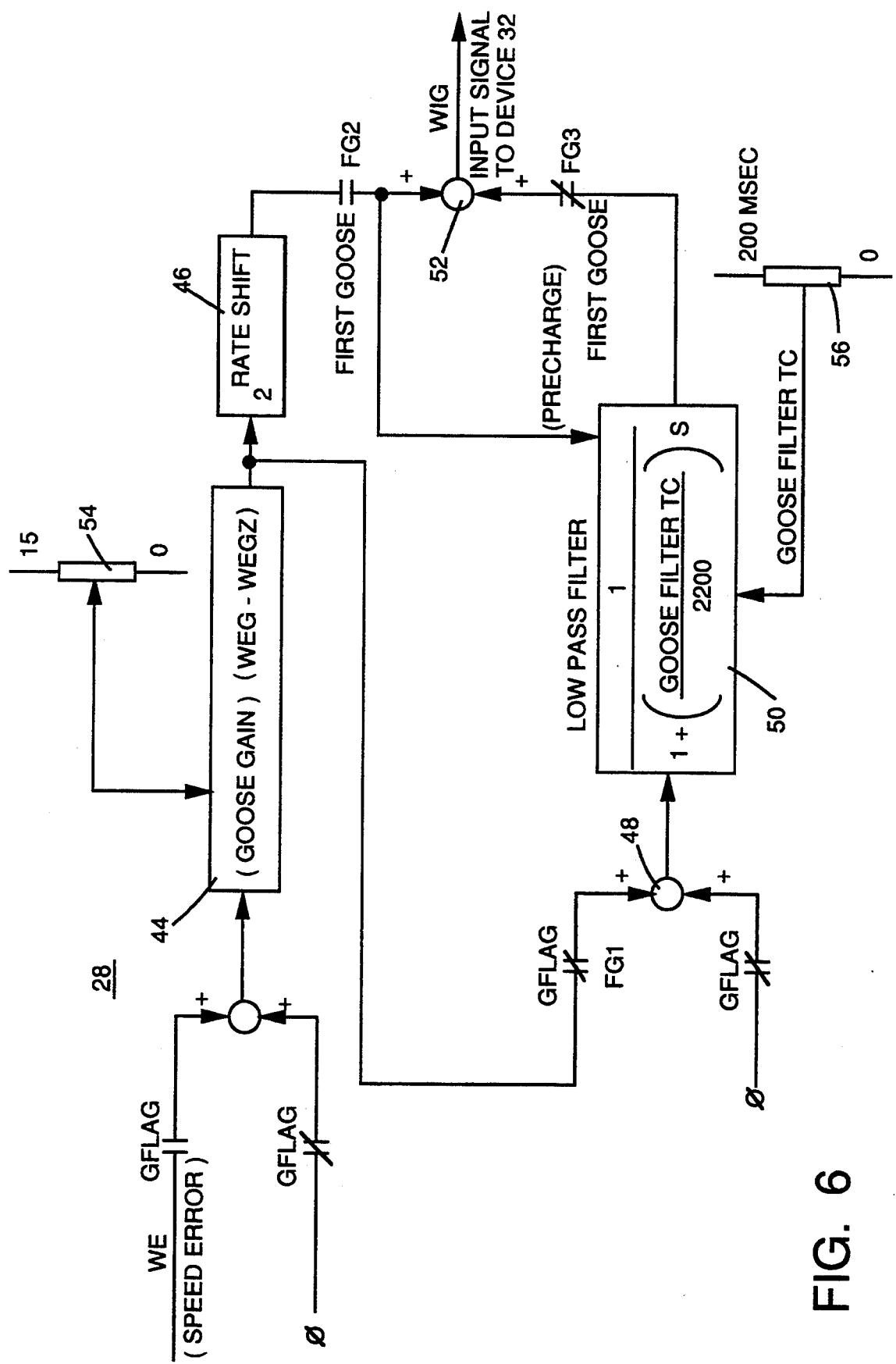
FIG. 6 shows a more detailed block diagram of the impact load controller of the present invention.

FIGS. 3, 5, and 6 show in detail the impact load controller 28 of the invention, and FIG. 4 shows the derivation of the rate dynamics for the impact load controller 28.

Before further discussing the description and operation of the present invention, it is to be noted that the armature current reference Ia* in FIGS. 1 and 3 is generated during the normal operation of the mill by (PI) speed controller 34. The transfer function of the PI speed controller shown in FIG. 3 is $$(1+T_1S)/T_xS$$

where
S=Laplace operator (1/sec.)
$T_1$=current controller lead time constant (sec.)
$T_x$=current controller integrator time constant (sec.).

The output of PI controller 34 is electrically coupled to thyristor armature supply (TAS) 14 (FIG. 1) which has associated therewith the following transfer function:

$$K_v e^{T_dS}$$

where
$K_v$=TAS static gain, and
$T_d$=TAS transport time delay (sec.)

The transfer function for the (PI)² speed controller 30 is given in U.S. Pat. No. 3,775,653 discussed hereinbefore, and represented is FIG. 3 by $1/T_2S$, where $T_2$ is a time element and S is the Laplace operator. The symbols to the right of (PI) speed controller 34 in FIG. 34 in FIG. 3 represent limits for the field flux $\phi_f$ of motor 12 and for the armature reference current $I_a*$, and the transfer function $1 \div \phi_f$ for motor 12. These components are further explained in U.S. Pat. No. 3,950,684 cited hereinbefore.

As mentioned hereinbefore, the operation, transfer functions, etc. of the components in FIGS. 1–6, with the exception of impact load controller 28, are conventional and need not be further discussed. Therefore, only impact load controller 28 of the invention will be discussed further with reference to FIGS. 3–16. It is to be noted that the impact load controller 28 of the invention can be either of the digital type microprocessor arrangement with the flow charts for a program being shown in FIGS. 8A–11B, or of the analog type arrangement shown in FIGS. 15A–16.

Particularly referring to FIG. 4, there is shown symbolically the derivation for the transfer function of load impact controller 28:

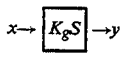

where
X=Input
Y=Output $$K_g = \text{Gain} \frac{(\text{Output})}{(\text{Input})}, \text{ and}$$

S=Laplace operator (1/sec.).
The Laplace operator, S, (1/sec.) is set equal to $$\frac{1 - Z^{-1}}{T_d},$$

where $Z^{-1}$ is a memory circuit equal to $e^{-T_dS}$, and $T_d$ is an updated time in milliseconds for the digital controller of the microprocessor used in the invention.

If $$\frac{\text{Input}}{\text{Output}} = K_gS = K_g \frac{1 - Z^{-1}}{T_d},$$

then the output for the impact load controller 28 of the invention is:

$$X \frac{(K_g)}{(T_d)} (1 - Z^{-1}) = \text{Input} \frac{(K_g)}{(T_d)} (1 - Z^{-1})$$

where in FIG. 5, the flow charts of FIGS. 8A–11B, $K_g/T_d$ is indicated as being (GOOSE GAIN) and $1-Z^{-1}$ is indicated as being [WEG−WEGZ]. WEG represents the present speed error, and WEGZ represents the previous speed error in the memory circuit of the impact load controller 28.

As shown in the bottom portion of FIG. 4, the speed error WE, which is the output of summer device 26 shown in FIGS. 1 and 3 represents the input to impact load controller 28, and the altered output is represented by WIG which is the input signal to summer device 32.

FIGS. 5 and 6 show in greater detail the impact load controller 28 of the invention.

Referring now to FIGS. 5 and 6, there is shown unit 44, multiplier 46, summer device 48, low pass filter 50, and summer device 52. FIG. 6 additionally shows a tuning device 54 for unit 44, and a tuning device 56 for filter 50.

As indicated in FIG. 6, tuning device 54 can change or fine tune the goose gain value of unit 44 in a range of absolute values from zero to 15, and tuning device 56 can adjust or fine tune the goose filter time constant of low pass filter 50 in a range from zero to 200 milliseconds. These tuning devices 54 and 56 are equivalent to a potentiometer in an analog electrical type control arrangement for load impact controller 28, or can be incorporated into the program in a digital based microprocessor control arrangement for load impact controller 28.

As shown in FIG. 6, low pass filter 50 is a first order filter and operates on the following transfer function:

$$\frac{1}{1 + \frac{(\text{GOOSE FILTER } TC)}{(2200)} S}$$

where
TC=time constant for the filter, and
S=Laplace operator (1/sec.).
The time constant is set by the values of the resistor and capacitor elements for the electronic equivalent for filter 50. In FIGS. 5 and 6, unit 44 contains a gain factor which is represented by (GOOSE GAIN) and a rate of the change in the speed error which is represented by [WEG−WEGZ], where, as stated hereinbefore, WEG represents a present speed error value and WEGZ represents a previous speed error value. The gain factor (GOOSE GAIN) is a multiplier for the difference between the present speed error value and the previous speed error value. The values in parenthesis and in the brackets of unit 44 contain variables, which change the output of unit 44, more about which will be more fully appreciated hereinafter.

With regard to the multiplier 46 of FIGS. 5 and 6, the output from unit 44 is increased an amount which is indicated in block 46 as being "$2^{RATE\ SHIFT}$". This value is a representation for a binary address location, where it is conventionally known that if the location is shifted two places to the left, the input is multiplied by the integer raised to a power, and if the location is shifted to the right in the register, the input is divided by the integer raised to a power. In this particular instance, the base integer is always the numeral "2" raised to a power ranging from 0 to 5. From the above, it can be appreciated that the tuning parameters for the impact load controller 28 are the "GOOSE GAIN" of unit 44, the Goose Filter Time Constant of filter 50, and the multiplier of element 46. Once these parameters are set for a particular operation, they remain fixed throughout that operation.

Also shown in FIGS. 5 and 6 are logical switches indicated as being GFLAG and FIRST GOOSE. The GFLAG logical switches are associated with unit 44 and filter 50 for their operation and deactivation, and the GOOSE FILTER switches, FG1, FG2, and FG3, are associated with the low pass filter 50, for its initial precharging, and for its output being either connected or interrupted with respect to summer device 52, more about which is discussed hereinafter.

Figure 7A:
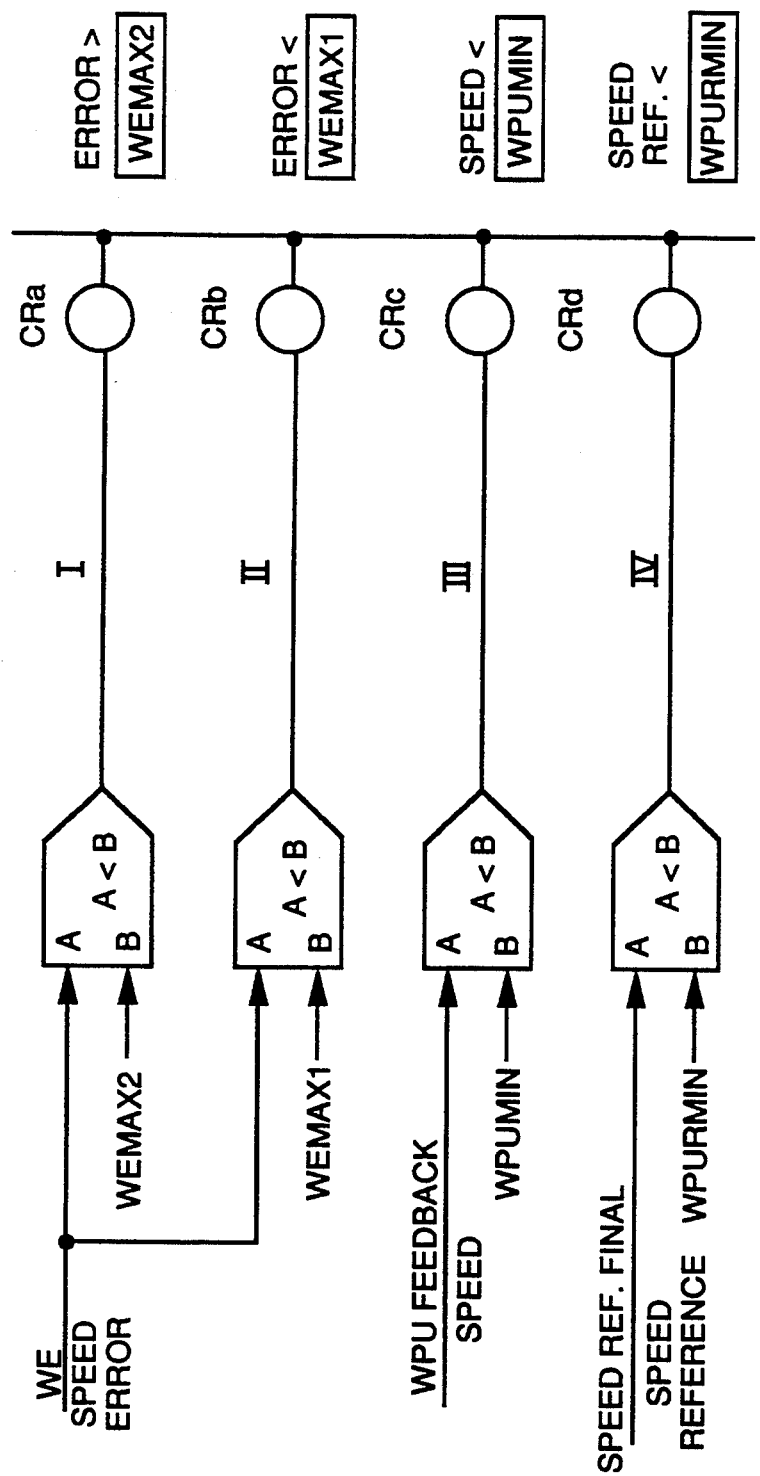
FIGS. 7A and 7B show a logic diagram for operating the present invention.
Figure 7B:
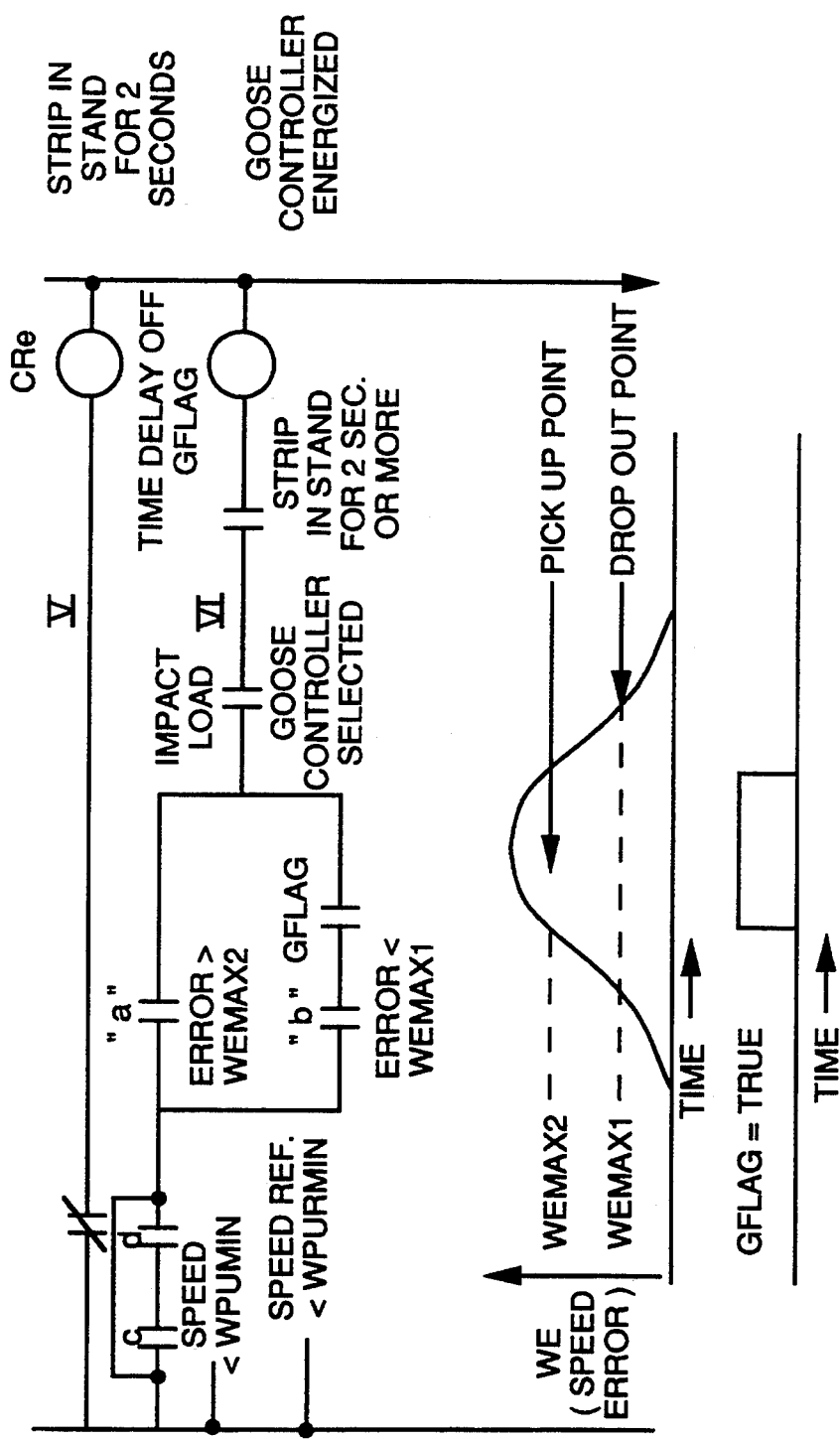

The impact load controller 28 of the invention operates on a logic system which is part of the main logic system for the mill. An example for such a logic diagram is shown in FIGS. 7A and 7B. When the logic signal "GFLAG" is True, the Goose Control of the load impact controller 28 is energized. A speed error WE or WEG input enters unit 44, which operates on the transfer function of FIG. 4. When the Goose Control is first energized, the FIRST GOOSE Logic Command is True, and the initial output from unit 44 goes into multiplier 46, where its value is increased by a factor of $2^{RATE\ SHIFT}=4$, where "RATE SHIFT", preferably, is equal to 2. This initially gives a high input signal to PI controller 34. At the same time, i.e. when the output from multiplier 46 is directed to summing device 52 of FIG. 5, this output from unit 46 is also directed to low pass filter 50 to precharge filter 50, with no output from filter 50 being directed to summing device 52.

After this initial precharge of impact load controller 28, the FIRST GOOSE logic signal is set to "False", which opens the logic switch FG 2 and closes the FIRST GOOSE logic switch FG1 shown in FIGS. 5 and 6. The output from the product gain unit 44 is reduced since multiplier 46 is now bypassed, with the output from unit 44 directed to summer device 48, and then to the low pass filter 50. The FIRST GOOSE switch FG3 associated with filter 50 is now closed allowing its output to be directed to summer device 52 for an output designated as WIG as shown in FIGS. 5 and 6.

Preferably, the $(PI)^2$ speed controller (FIG. 1) will operate in conjunction with the impact load controller 28 to receive the error signal WE and to produce an output for a total of three inputs to the summer device 32 of FIG. 3, as explained hereinbefore. When impact load controller 28 is not operating, the $(PI)^2$ speed controller 30 is turned off, so that the only input to summer device 32 is the speed error WE from summer device 26, shown particularly in FIG. 3. The impact load controller 28 is a pure rate controller in that a derivative or rate of change in speed error is used to change the dynamics of the multi-loop speed regulator system 10 of FIG. 1. The dynamics of the impact load controller 28 is a pure rate cascaded through the low pass filter 50. At the initial turn "on" of the impact load controller 28, the controller 28 is a pure rate controller with a high gain. The gain factor $2^{RATE\ SHIFT}$ in the multiplier 46 can be increased or decreased by increasing or decreasing the integer value of "RATE SHIFT". The gain (GOOSE GAIN) for impact load controller 28 and the time constant "GOOSE FILTER TC" for the low pass filter 50 can be adjusted by a tuning device 54, 56 respectively. These adjustments, as well as the adjustment to multiplier 46, are only done in the mill set-up and not during the operation of the invention or the mill.

Preferably, the impact load controller 28 and $(PI)^2$ speed controller 30 are only used in the threading phase of the mill when the strip initially enters the roll bite of a stand. Also, preferably, these two components 28 and 30 remain in operation during this threading phase for only two (2) seconds after the strip enters the roll bite. Both impact load controller 28 and $(PI)^2$ speed controller 30 can be reset to zero in preparation for the next threading operation of the mill.

The impact load controller 28 is energized when one or more conditions are satisfied. These conditions appear in the logic diagram of FIGS. 7A-7B, which also shows a speed error curve and a GFLAG=TRUE curve versus time. For a cold rolling tandem mill, there are three conditions for energizing the GFLAG and Goose logic control, and thus, the impact load conntroller 28. These three conditions are shown on lines I, III, and IV of FIG. 7A, and are 1) if the speed error WE is greater than WEMAX 2; 2) if the stand speed feedback is less than WPUMIN; and 3) if the stand speed reference is less than WPURMIN. The "WEMAX 2" condition is the pickup point for operation of the impact load controller 28 as shown in the speed error curve near the bottom of FIG. 7B. The minimum value for actual speed at which the stand is operating during the threading phase is represented by "WPUMIN," and the minimum value for a desired or reference speed for the stand in the threading phase is represented by "WPURMIN."

Preferably, for assured operation of the Goose control of the invention, the speed error WE will exceed 0.5% of the maximum stand speed, and the stand speed reference WPURMIN and the stand speed WPUMIN will both be less than 3.8% of the maximum stand speed. This maximum stand speed may be as low as 200 ft/minute and as high as 500 ft/minute for the threading operation of a tandem cold rolling mill.

The impact load controller 28 is de-energized when the speed error WE becomes the drop out point for the operation of the invention or becomes less than "WEMAX 1" as shown in the speed error curve near the bottom of FIG. 7B and indicated on line II of the logic diagram of FIG. 7A, or until the strip has been in the stand for two seconds as indicated on line V. These lines, I, II, II, IV, and V of FIGS. 7A-7B have associated with them control relays CRa, CRb, CRc, CRd, and CRe.

In a cold rolling mill, relays CRa, CRb, CRc, CRd, and CRe come into play for activation and deactivation of the GFLAG and Goose logic signals in the threading phase of the mill because the mill operates at low mill speeds to activate all the relays. In a hot mill, only relays CRA, CRb, and CRe come into play, and relays CRc and CRd are not applicable as shown in FIG. 7B.

In a hot mill, the threading speeds are relatively high thereby preventing the speed and speed detectors represented along lines III and IV from being energized.

The flowcharts for a program for the operation of the impact load controller 28 of the present invention in a microprocessor type of control arrangement is shown in FIGS. 8A to 11B.

The logic diagram of FIG. 7B has on Line VI a relay entitled "Impact Load—Goose Controller Selected." These FIGS. 8A–11B show steps involved for the operation of the Goose controller of the load impact controller 28. If the Goose controller is not selected, the program goes down along line ∓A" to the bottom of FIG. 11B to blocks 62 to 72 where "FIRST GOOSE" and GFLAG are set to "False;" COUNTG and WEG are each set to zero; and WEZ is made equal to WE; and then to block 73 where WIG is set to zero. These variables can be reset for another threading operation of the mill. If the Goose controller is selected, the first test is to determine whether the strip is in the stand as indicated by SISIN in block 74. If "no," then COUNTG which is a timer is set to zero as seen in block 76, and the program proceeds to the next test in block 78. If the answer is "yes" to the test in block 74, the program proceeds to a test in block 80 asking whether COUNTG is less than COUNTGMAX which is a preset value in the microprocessor. If the answer in the test of block 80 is "no," this indicates that the strip in the stand has been in the roll bite for two (2) seconds or more, and COUNTG is set to COUNTGMAX, as indicated in block 82. If the answer to the test in block 80 is "yes," the time counter is incremented by 1 as indicated in block 84.

The program proceeds from blocks 82 and 84 to the test control in block 78. This test in block 78 is to see whether the Goose control turn "on" is to be checked. Three conditions are necessary in order for this test to be satisfied. These conditions are "strip not in stand" (NOT SISIN), and COUNTG is greater than zero, but less than COUNTGMAX. If the answer to test 78 is "no," the Goose control is "off," and the following variables are set as shown in blocks 86 to 94 where FIRST GOOSE is set to TRUE; GFLAG=FALSE; WE=0; WEZ=WE; and WIG=Low Pass Filter. This last block 94 indicates a subroutine where WEG is a new output, WIG is the previous output, and Goose Filter TC is the tuning package. The output from subroutine 94 goes along line "B" to the bottom of FIG. 11B where it goes to junction 75.

Figure 8A:
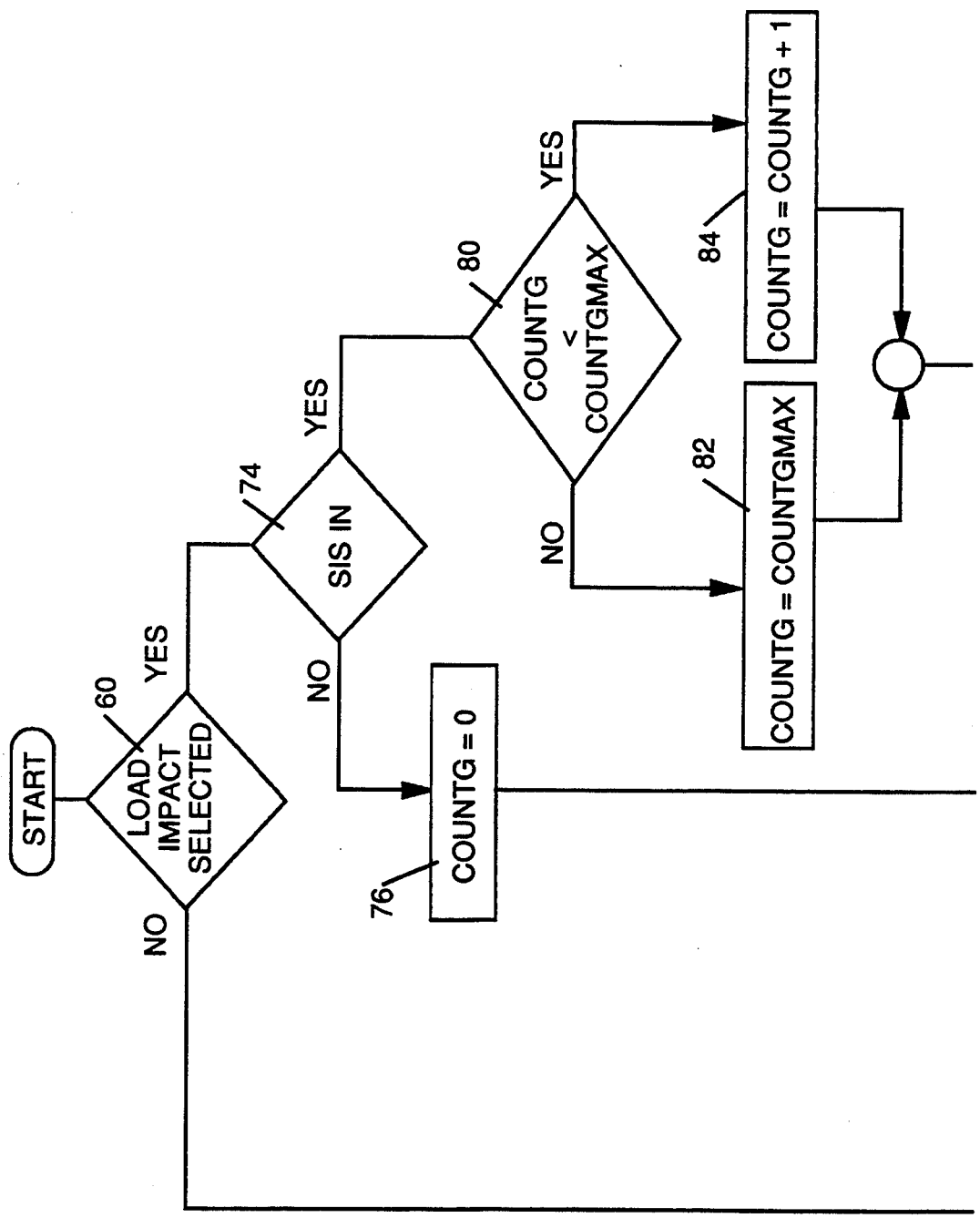
Figure 8B:
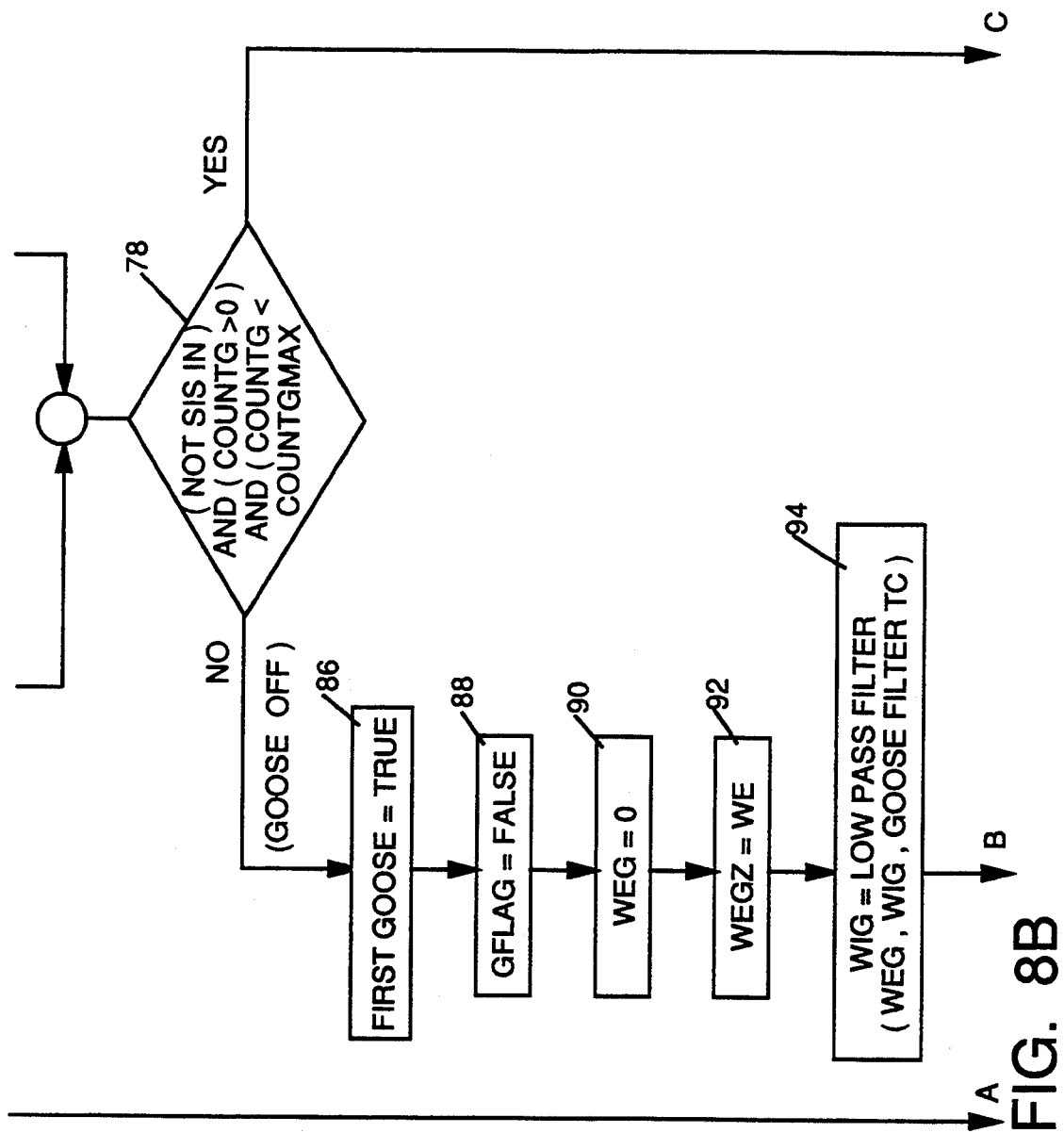
Figure 9A:
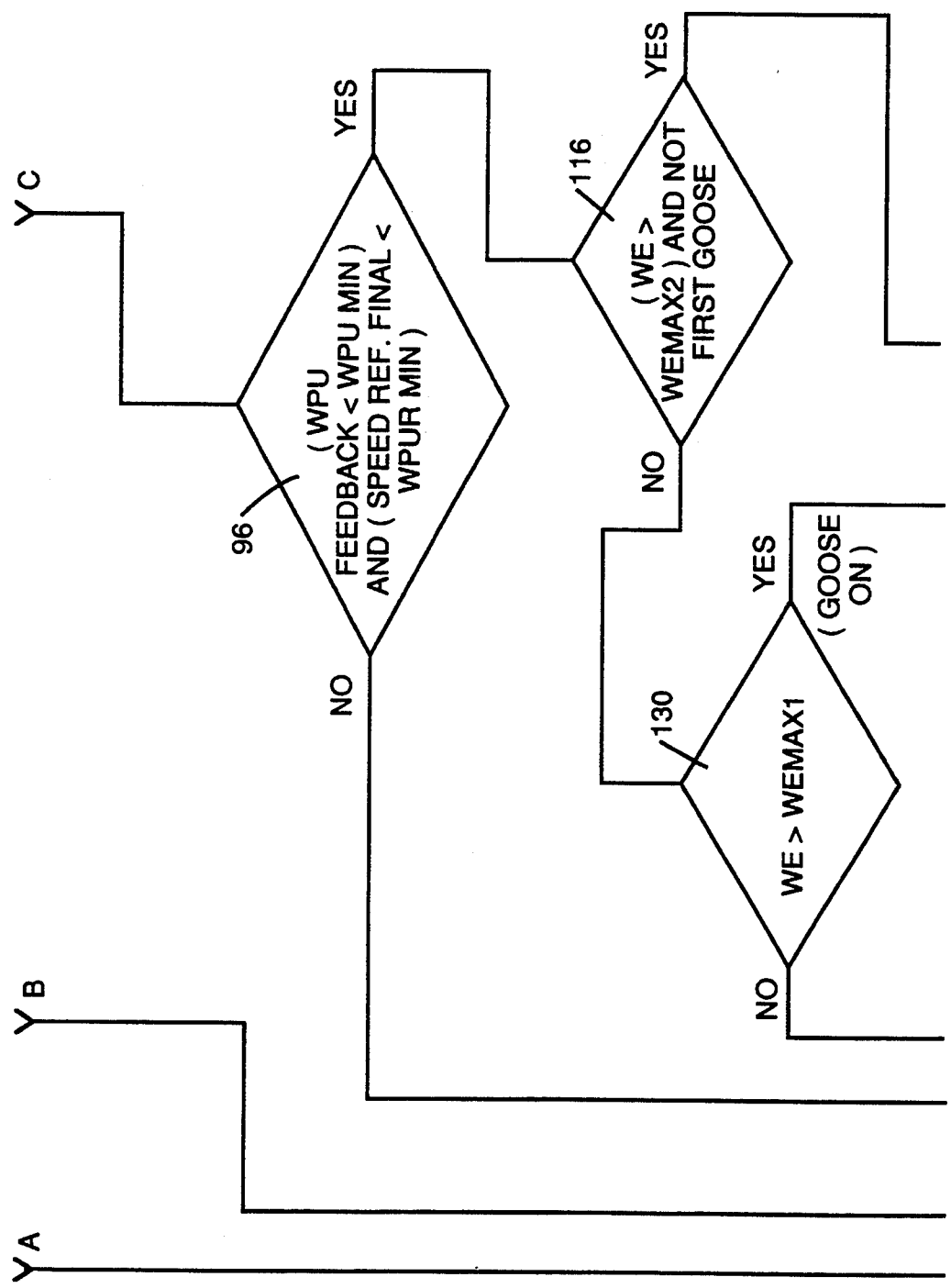

If the answer to test 78 in FIG. 8B is "yes", then the Goose control of the impact load control 28 is "on." The program proceeds along line "C" to the test in block 96 in FIG. 9A. This test in block 96 tests to see if the speed and the speed reference requirements are met. The two conditions which must be met are: 1) the stand speed feedback, WPU FEEDBACK SPEED, be less than the minimum speed for the stand (WPUMIN), and 2) the final stand speed reference be less than the minimum speed reference (WPURMIN). If the answer to block 96 is "no," this interprets the drive motor 12 as running at a high speed value for the mill. The program proceeds down along line "d" to FIG. 11A to blocks 98, 100, 110, 112, and 114 where FIRST GOOSE=TRUE; GFLAG=FALSE; WEG=0; WEGZ=WE; and WIG=Low Pass Filter. Block 114 is a subroutine similar to that of block 94 of FIG. 8B. From block 114, the program proceeds to junction 75.

If the answer to test 96 in FIG. 9A is "yes," then the drive speed of motor 12 is a low threading speed for the stand, and therefore, the Goose control can be turned "on." A further test in block 116 tests to see if the speed error is sufficient to turn the Goose control "on." Two conditions must be met: 1) the speed error WE has to be greater than WEMAX 2; and 2) the "FIRST GOOSE" is not going through the impact load controller 28.

If the answer to the test in block 116 is "yes", the Goose control is "on," and the program proceeds to blocks 118, 120, and 122 where GFLAG is set to "True"; WEG is set to WE; and WEG is made equal to (GAIN) [WEG−WEGZ], where [WEG−WEGZ] is the difference in the present and previous speed errors in unit 44 of the load impact controller 28 of FIG. 5. From block 122, the program proceeds to blocks 124, 126, and 128 in FIG. 10A, where WIG=Low Pass Filter, WEGZ=WE; and FIRST GOOSE=FALSE. Block 124 is a subroutine similar to that of blocks 94 and 114.

Figure 10A:
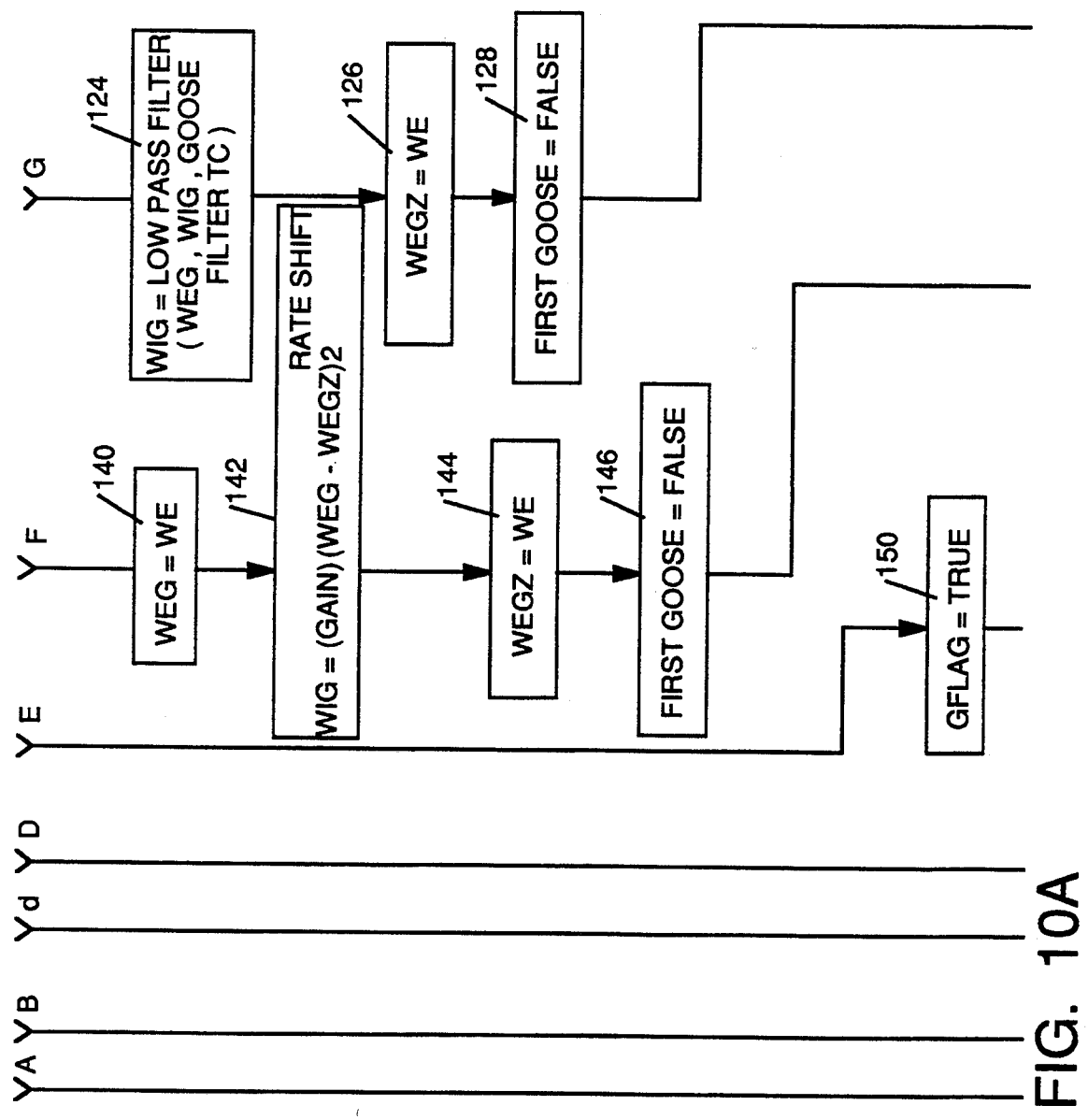
Figure 10B:
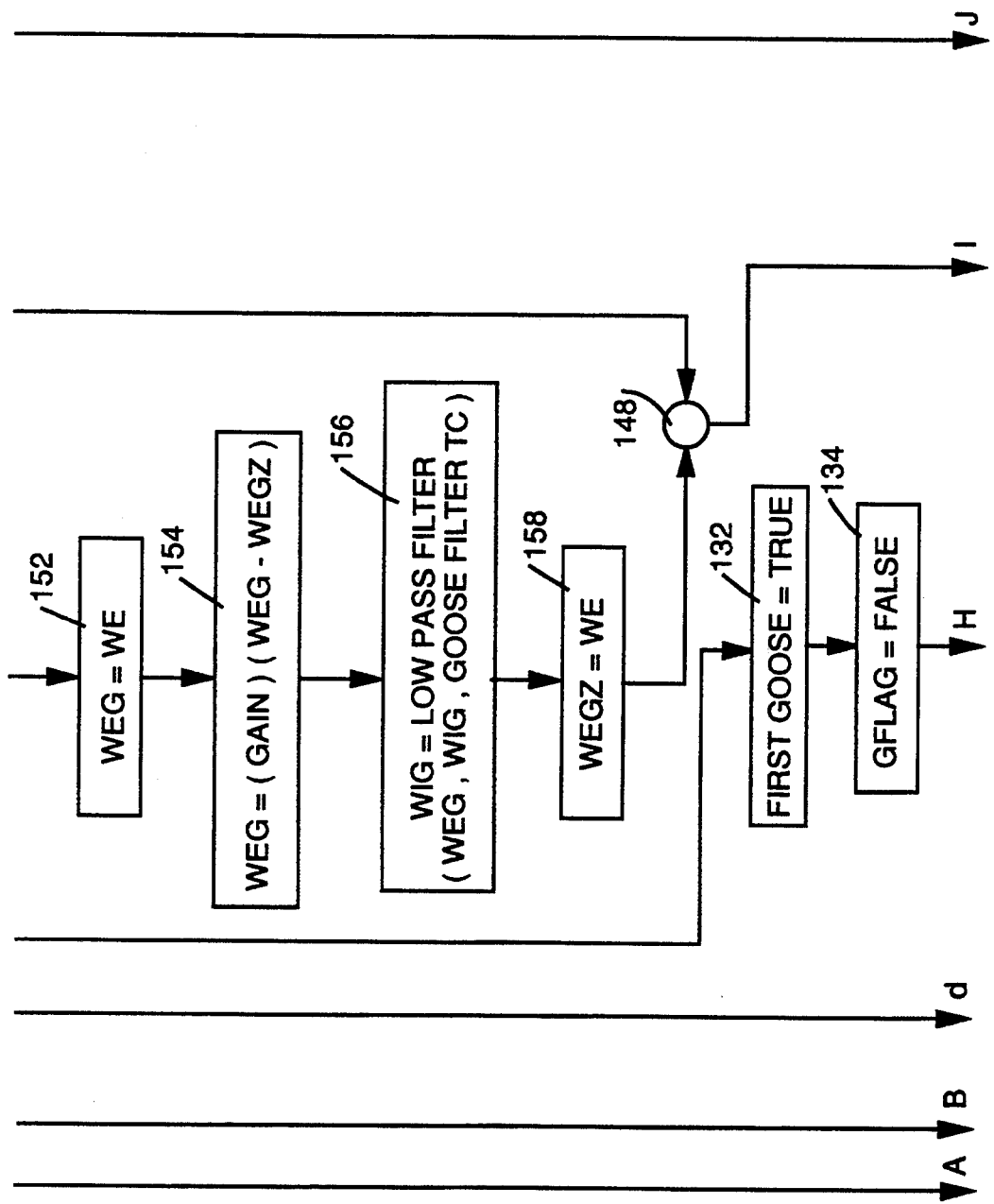
Figure 11A:
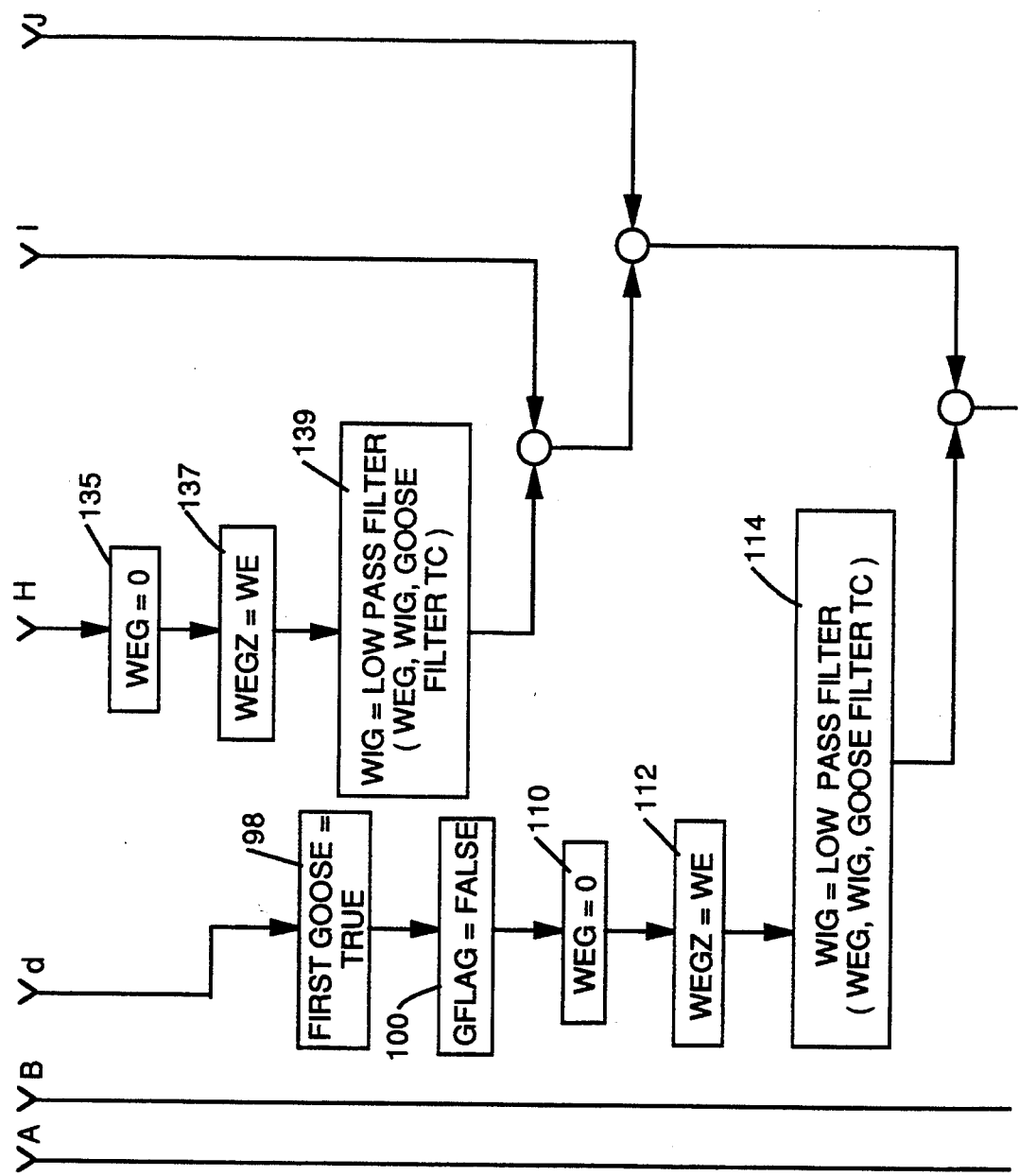
Figure 11B:
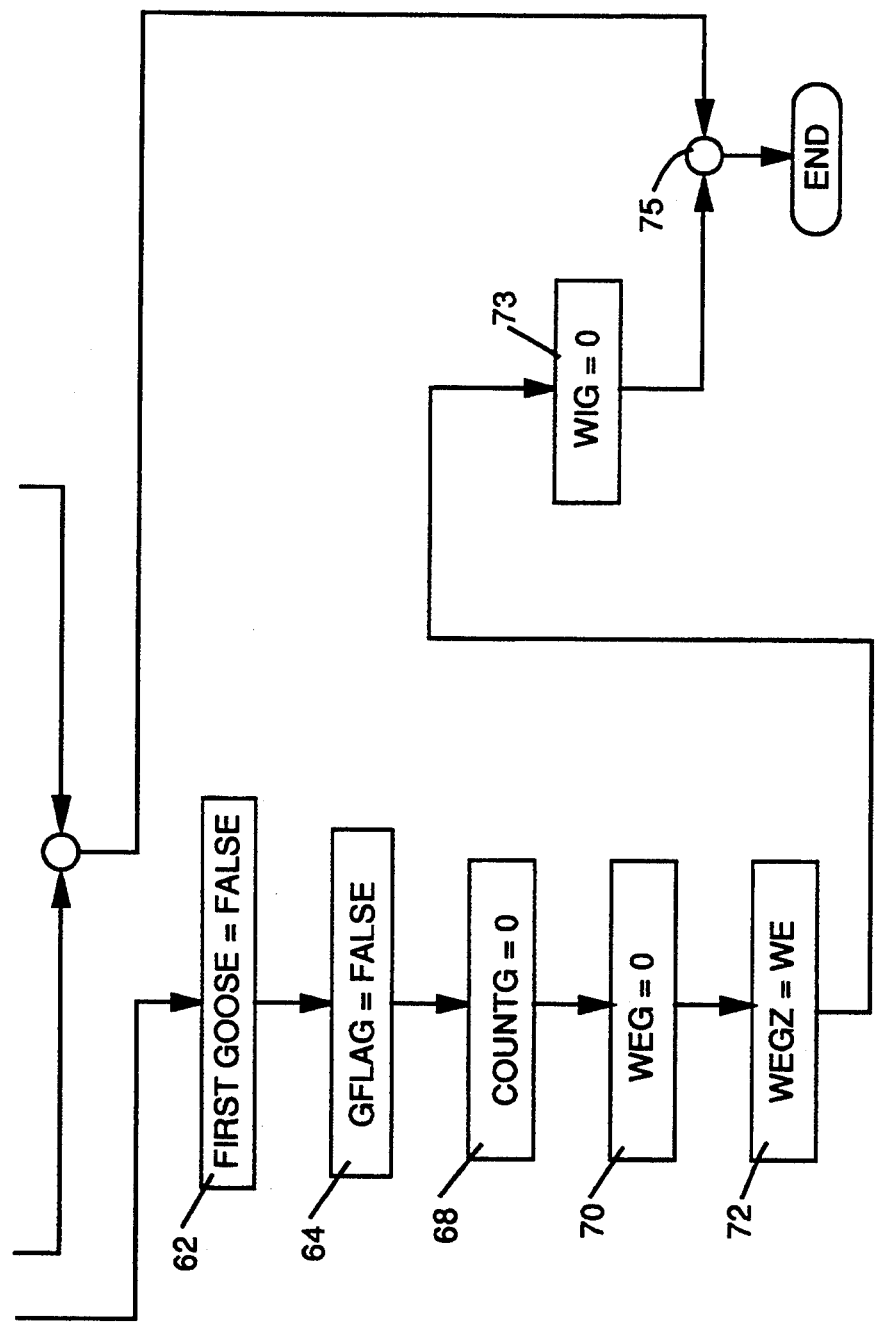
Figure 12:
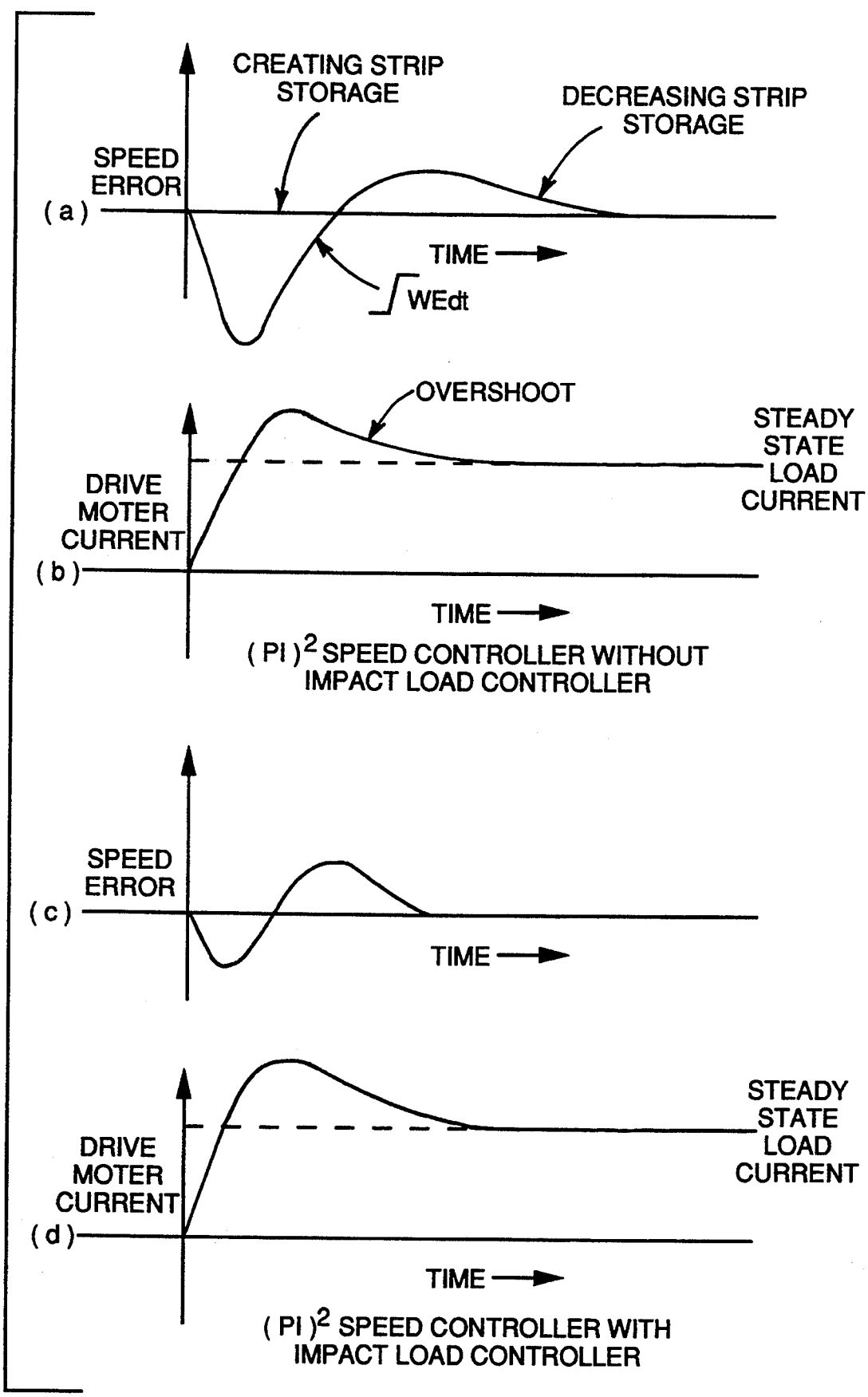
FIG. 12 shows curves (a) and (b) for a proportional integrator squared (PI)$^2$ speed controller with the (PI) speed controller and without the impact load controller of the invention; curves (c) and (d) for a proportional integrator squared (PI)$^2$ speed controller with the (PI) speed controller and with the impact load controller of the invention.

From block 128 of FIG. 10A, the program proceeds along line J to junction 75 at the bottom of FIG. 11B. Referring again to FIG. 9A, if the answer to the test in block 116 is "no" the program proceeds to test block 130. This block 130 tests to see if the maximum speed error has been exceeded. If the answer is "no" the Goose control is "off." The program proceeds along line D to blocks 132 and 134 in FIG. 10B. In block 132, FIRST GOOSE is set to TRUE, and in block 134, GFLAG is set to FALSE. From block 134, the program proceeds along line H to blocks 135, 137, and 139 of FIG. 11A, and eventually to junction 75. In these blocks 135, 137 and 139 WEG=0, WEGZ=WE, and WIG=Low Pass Filter (WEG, WIG, GOOSE FILTER TC), respectively.

If the answer to the test in block 130 is "yes", then the Goose control is "on". Test block 136 provides for a correction to the Goose control. If "yes", it is the First Window for the program, and the program proceeds to set GFLAG=TRUE in block 138. From line F, the program proceeds from block 138 to blocks 140, 142, 144 and 146 of FIG. 10A. Block 140 sets WEG to WE; and block 142 sets WIG to (GAIN) [WEG−WEGZ] $2^{RATE\ SHIFT}$ which is derived from components 44 and 46 of the impact load controller 28 of FIG. 5. Block 144 sets WEGZ to WE. Block 146 sets FIRST GOOSE to FALSE. The program proceeds from block 146 to junction 148, and along I to FIG. 11 to eventually come to junction 75.

Referring to again to FIG. 9B, if the test in block 136 is "no", then the input is through the impact load controller 28 for the first time. The program proceeds along line E to blocks 150, 152, 154, 156 and 158, where GFLAG=TRUE; WEG=WE, WEG=(GAIN) [WEG−WEGZ], WIG=Low Pass Filter; and WEGZ=WE. The block 156 is a subroutine similar to block 94. Block 154 contains the difference in the previous and present speed errors. The program proceeds from block 158 to junction 148, and along line I to FIG. 11A, and eventually to junction 75.

The impact load controller 28 for a stand of a rolling mill will be automatically operated basically during the threading phase as the strip enters the roll bite and will continue to operate for approximately two seconds thereafter.

The impact load controller 28 will be operated preferably in parallel with $(PI)^2$ speed controller 30, for controlling (PI) speed controller 34.

FIGS. 12a and 12b show a typical speed regulator response when (PI)² speed controller 30 is operated without the impact load controller 28 of the invention and in series with (PI) speed controller 34. FIGS. 12c and 12d show a typical speed regulator response when (PI)² speed controller 30 is used in parallel with the impact load controller 28 and inn series with (PI) speed controller 34. The horizontal axis of FIGS. 12b and 12d represents the steady state load current with the area above this axis representing the overshoot. For the speed error curves, the bottom portion of the curves of FIGS. 12a and 12c represents the gathering of the strip between stands, is the integral of the rate of change in speed error with respect to time, and has a positive speed error value. The top portion of the curve of FIG. 12(a) represents the elimination of the strip storage, is the integral of the rate of change in speed error, and has a negative speed error value.

It is readily observed when comparing these FIGS. 12a and 12c that both the maximum speed drop (speed error) and therefore the integral of the speed error are greatly reduced when the impact load controller 28 is used in parallel with (PI)² speed controller 30. Also, it can be seen that the current for the drive motor is greatly increased in a shorter response time when the impact load controller 28 is used in parallel with (PI)² speed controller 30.

Figure 13:
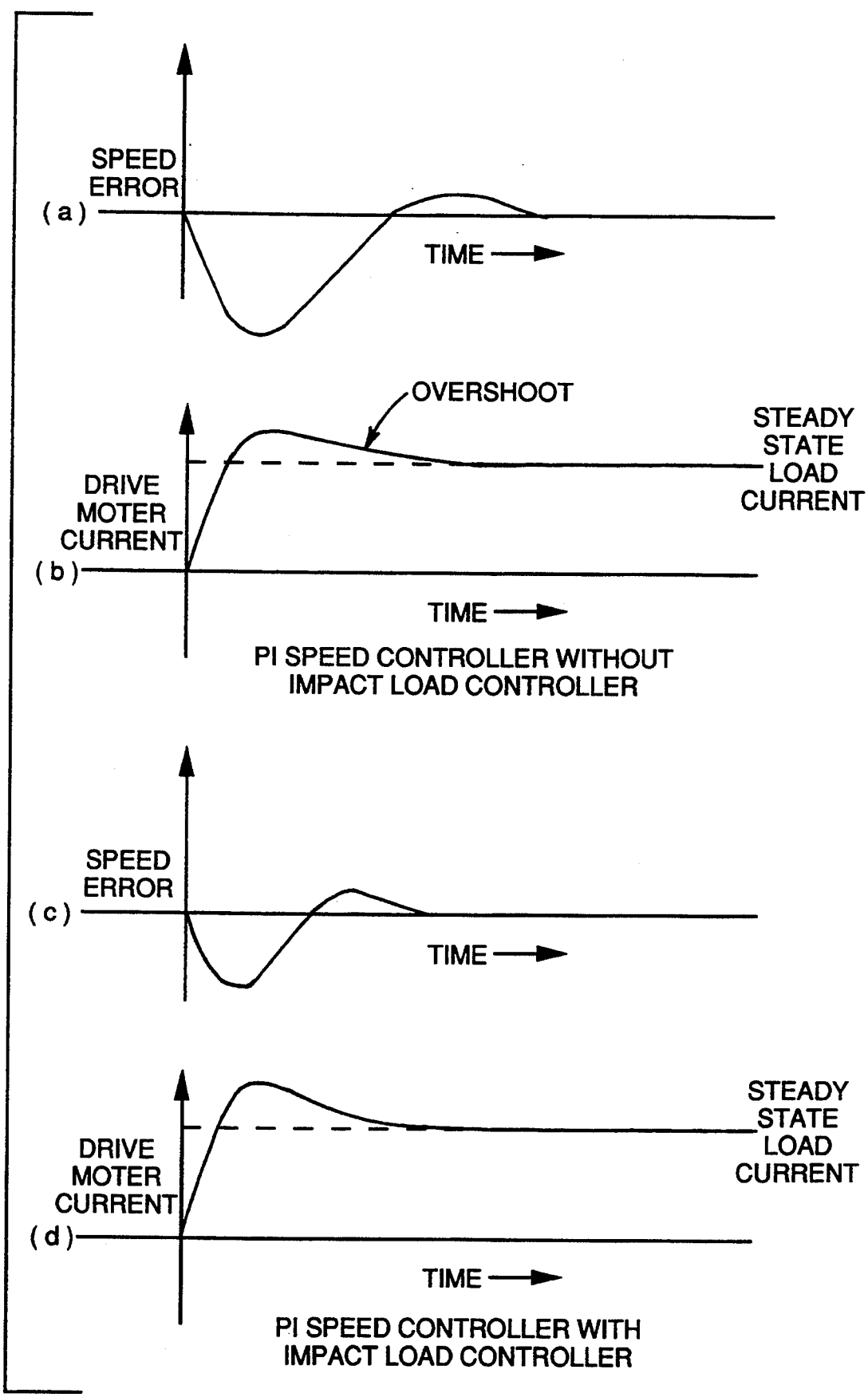
FIG. 13, curves (a) and (b) are curves for a proportional integrator (PI) speed controller without the (PI)$^2$ speed controller and the impact load controller of the invention; curves (c) and (d) are curves for a proportional integrator (PI) speed controller without the (PI)$^2$ speed controller and with the impact load controller of the invention.
Figure 14:
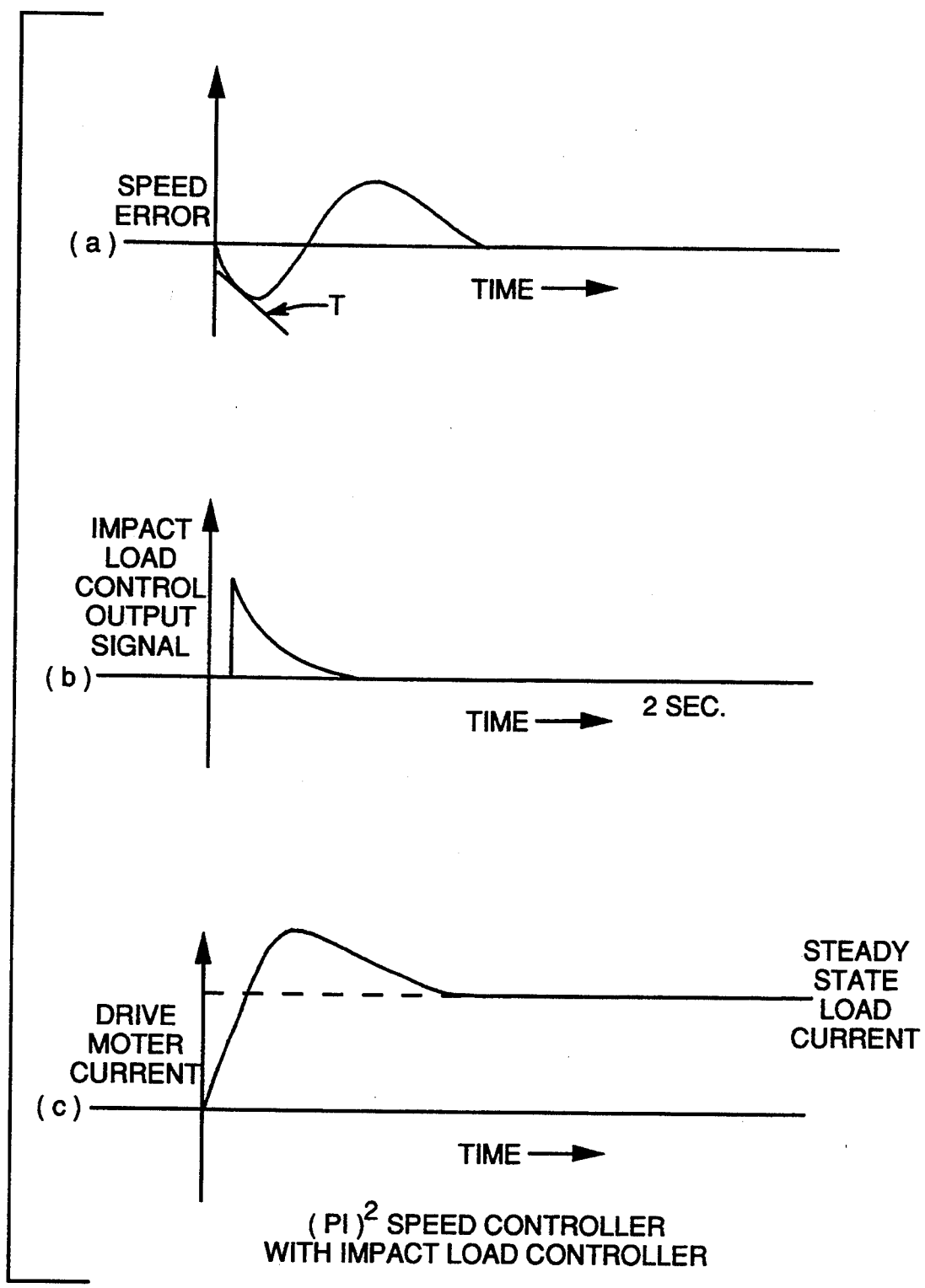
FIG. 14 curves (a)-(c) are curves for a proportional integrator squared (PI)$^2$ speed controller similar to that of FIGS. 12c and 12d and including an output signal for the impact load controller of the invention.

FIGS. 13a and 13b show a typical speed regulator response when (PI) speed controller 34 is operated without impact load controller 28 of the invention and without (PI)² speed controller 30, and FIGS. 13c and 13d show a typical speed regulator response when (PI) speed controller 34 is used in series with the impact load controller 28 and without (PI)² speed controller 30. The horizontal axis of FIGS. 13b and 13d represents the steady state load current with the area above this line representing the over shoot. The bottom portion of the speed error curves of FIGS. 13a and 13c represents the gathering of the strip between stands, and the top portion represents the decreasing of the strip storage similar to what was explained for FIGS. 12(a) and 12(c). When comparing FIGS. 12c and 12d to FIGS. 13c and 13d it can be seen that there are better response results when (PI)² speed controller 30 is used in parallel with impact load controller 28 and in a series with (PI) speed controller 34, as opposed to the impact load controller 28 only being used in series with (PI) speed controller 34 without the use of (PI)² speed controller 30. Also, it can be seen that better response results are obtained when using the impact load controller 28 as opposed to not using controller 28.

FIGS. 14a, 14b, and 14c again represent a typical speed regulator response when (PI)² speed controller 30 is used in parallel with impact load controller 28 and in series with (PI) speed controller 34. FIGS. 14a and 14c are similar to FIGS. 12c and 12d. FIG. 14b represents the output signal of impact load controller 28 when the strip is in the stand for a two second time interval. The curve shows a vertical line or "spike" followed by a smooth gradual decaying exponential portion. The use of components 44 and 46 as taught hereinbefore produces an initial sharp increase in the dynamics of the system and filter 50 allows a gradual, slow decay in the response of the system.

Impact load controller 28 is energized when the speed error exceeds a "WEMAX 2" setting. This is represented in FIG. 14a by the tangent line or slope of the curve indicated at "T". As seen inn FIG. 14b the output signal of impact load controller 28 jumps to a value which is a function of the rate of change in the speed error and proportional thereto, and then decays exponentially in a matter as a function of the time constant of the low pass filter 50 of FIG. 5. For a microprocessor control of FIGS. 8-11, the response time is instantaneously, whereas for an analog control of FIGS. 15 and 16, there may be a short time delay for the response.

As stated hereinbefore, the initial output of impact load controller 28 is a function of the rate of change in the speed error which is based on the actual speed and a desired speed. The rate of change in speed error at the time of the initial impact load is a direct function of the magnitude of the impact load torque disturbance applied to the drive motor 12 of FIG. 1. In view of this, the larger the impact load torque disturbance, the higher the output signal of impact load controller 28. After the initial output, the output of impact load controller 28 is a function of the low pass filter time constant setting whereby the rate of change in speed error decays exponentially as seen in FIG. 14b.

Impact load controller 28 adapts to the change in the magnitude of the impact load torque disturbance applied to the drive motor 12, i.e. the bigger the load, the greater the output signal of the impact load controller. This feature provides optimum reduction in drive speed error for the varying magnitudes of the load disturbances. Referring again to FIG. 1, at the onset of operation of impact load controller 28, the output signal passes instantly through the proportional part of (PI) speed controller 34, thus instantly providing an increase in the armature current reference signal Ia* to armature current controller 16 for control of the current to drive motor 12.

Figure 15A:
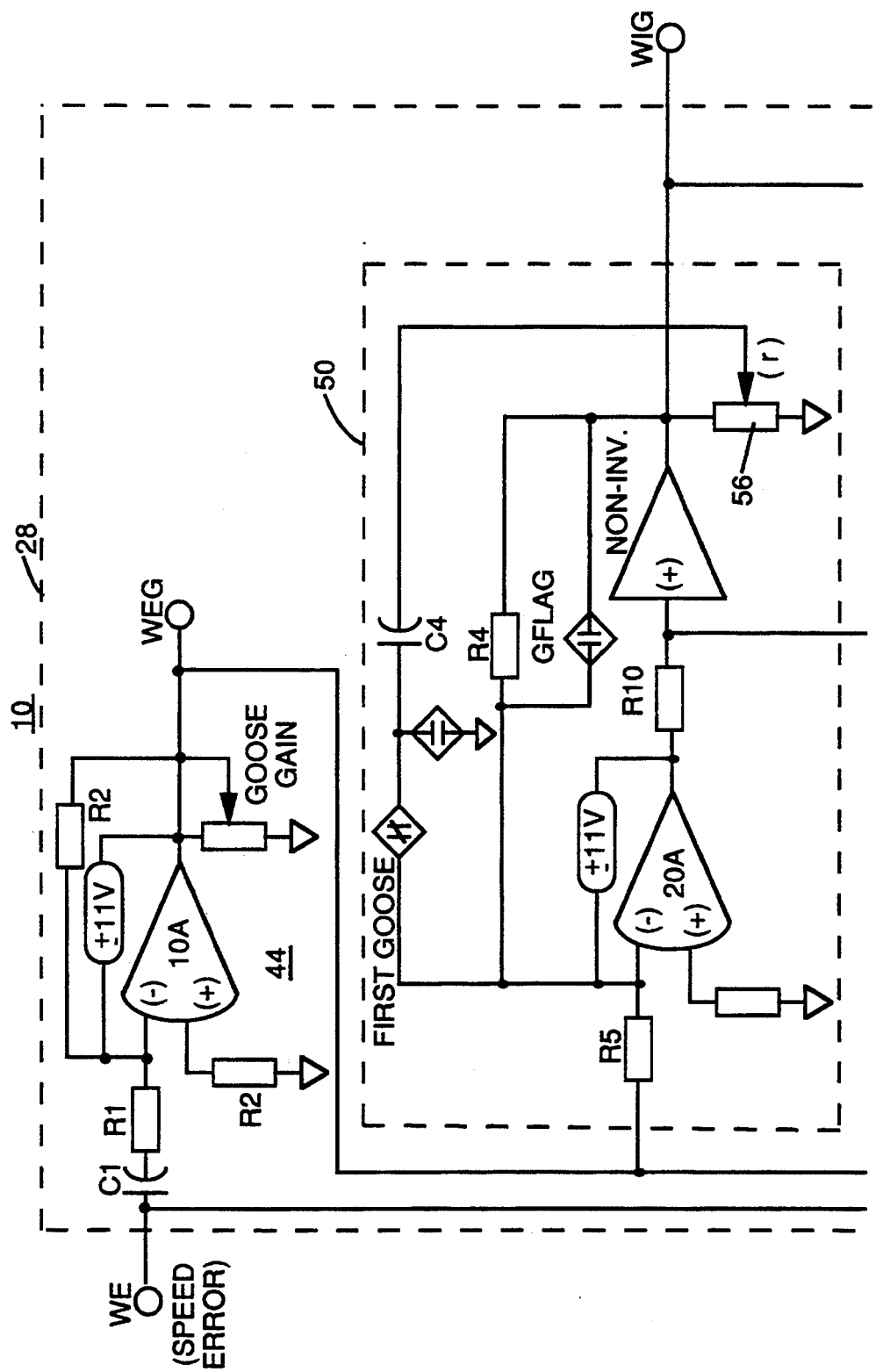
FIGS. 15A and 15B are schematic diagrams of an analog form of the impact load controller of the invention.
Figure 15B:
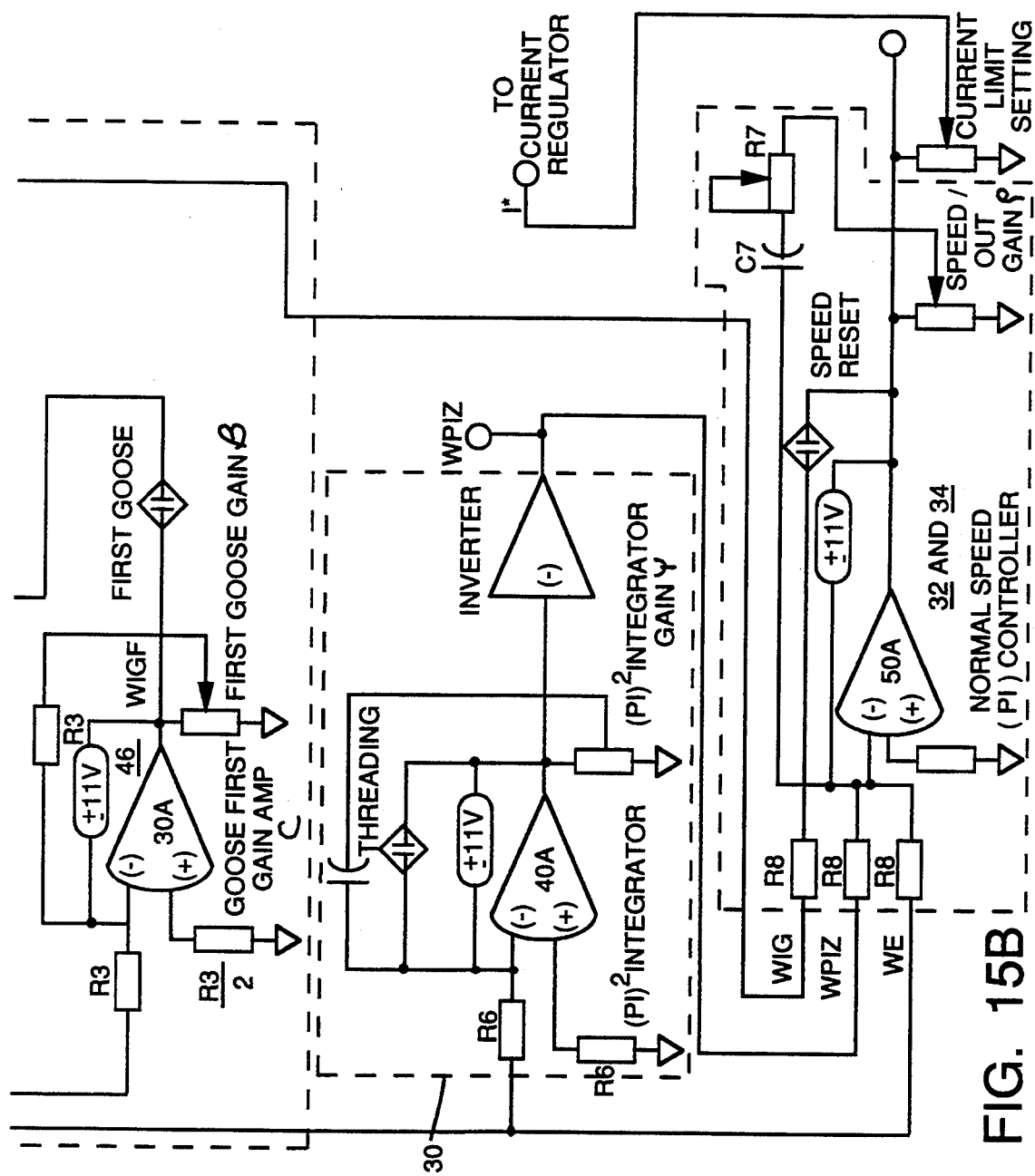

The impact load controller 28 can be either of a microprocessor type of arrangement as described herein, or it can be of an analog type consisting of several electrical and logic components as shown in FIGS. 15A, 15B, and 16 and having the same numerals as that shown in FIGS. 1-6, and which can easily be understood by those skilled in the art.

Whereas a particular embodiment of the invention has been described above for purposes of the invention has been described above for purposes of illustration, it will be evident to those skilled in the art that numerous variations of the details may be made without departing from the invention as defined by the appended claims.

I claim:

1. A speed regulator drive system for regulating the speed of a drive motor, comprising:

means for determining a speed error based on an actual speed value and a desired speed value and for using said speed error during the normal operation of said drive motor, and impact load controller means for producing a first output, said first output used to compensate for a reduction in said speed from a steady state speed in said normal operation of said drive motor and for supplementing at least said speed error for said regulating of said drive motor when a load disturbance is applied to said drive motor, said impact load controller means comprising:

rate controller means for receiving said speed error, for determining rates of change in said speed error, and for producing a gain value product including said rates of change in said speed error, means for initially increasing said gain value product to a first value by a desired amount to proportionately increase said speed of said drive motor to a value above said steady state speed, and filter means for receiving said first gain value product for precharging said filter means and for subsequently receiving second gain value products for exponentially decreasing said speed of said drive motor until said speed reaches said steady state speed.

2. A drive system of claim 1, further comprising:
(PI) speed controller means used in series with said impact load controller means for said regulating of said speed of said drive motor.

3. A system of claim 2, further comprising:
(PI)$^2$ speed controller means used in parallel with said impact load controller means for receiving said speed error to generate a second output, and means for combining said speed error with said first output of said impact load controller means and with said second output from said (PI)$^2$ controller means to generate a signal for controlling said (PI) speed controller means for said regulating of said speed of said drive motor.

4. A system of claim 1, wherein said rate controller means comprises:
means for storing and updating said speed error,
means for calculating the difference between an updated speed error and a stored speed error, and
means for multiplying said difference between said updated speed error and said stored speed error to product said gain value product.

5. A system of claim 1, wherein said rate controller means operates on the following transfer function:

$$K_g S = K_g \frac{(1 - Z^{-1})}{T_d} = \frac{K_g}{T_d}(1 - Z^{-1}) = (GAIN)(1 - Z^{-1})$$

where S is a Laplace operator in 1/seconds, $T_d$ is an updated time unit in milliseconds for said speed regulator drive system, and $Z^{-1} =_e - T_d S$, and $K_g$ is a constant.

6. A system of claim 1, wherein said rate controller means further comprises rate transfer function means having a Laplace operator.

7. A system of claim 1, wherein said filter means is a low pass filter of first order operating on the following transfer function:

$$\frac{1}{1 + \frac{(TC)}{(2200)} S}$$

where TC is a time constant setting for said filter means, and S is a Laplace transformer in 1/seconds.

8. A system of claim 1, wherein said means for initially increasing said gain value product includes the number 2 raised to a desired integer value.

9. A system of claim 1, wherein said rate controller means and said filter means each comprises adjustment means.

10. A system of claim 1, wherein said impact load controller means further comprises microprocessor means for activation and deactivation operation of said impact load controller means.

11. A system of claim 1, wherein said impact load controller means further comprises microprocessor means for operation of said impact load controller means.

12. A system of claim 1, wherein said system is a multiloop system comprising an inner loop current control and an outer loop speed control, and
wherein said impact load controller means is part of said outer loop speed control and operates in series with proportional integrator means and in parallel with proportional integrator squared means.

13. A system of claim 12, wherein said system is part of a main system for a rolling mill and controls the speed of two work rolls of a stand of said mill, which work rolls receive material to be rolled, and
wherein said main system includes means for detecting the entry of said material between said work rolls during the threading phase of said mill and means for activating and deactivating the operation of said impact load controller means within a desired time integral after said entry of said material.

14. A system of claim 13, wherein said rolling mill is a cold tandem mill, and said impact load controller means includes a logic system having a predetermined set of conditions for operation thereof in said cold tandem mill.

15. A system of claim 13, wherein said rolling mill is a hot tandem mill and said impact load controller means includes a logic system having a predetermined set of conditions for operation thereof in said hot tandem mill.

16. A speed regulator drive system for regulating the speed of a drive motor and having first speed controller means, comprising:
means for determining a speed error which is the difference between an actual speed value and a desired speed value, and
impact load controller means for compensating for a reduction in said speed from a steady state condition due to a load disturbance applied to said drive motor,
said impact load controller means comprising:
filter means, and
means for producing an initial signal and a series of sequential signals which are a function of a rate of change in said speed error, and including means for applying said initial signal to said first speed controller means for an increase in said speed of said drive motor which is greater than said steady state condition, and for applying said sequential signals to said filter means for further control of said first speed controller means for exponentially decaying said speed of said motor to its said steady state condition.

17. A system of claim 16, wherein said means for producing said initial signal and said sequential signals further comprises:
a first multiplier means for obtaining a gain value for said initial signal and said sequential signals.

18. A system of claim 17 wherein said means for producing said initial signal and said sequential signals further comprises:
second multiplier means, and
means for applying a signal of said second multiplier means to said initial signal.

19. A system of claim 16, wherein said filter means is a low pass filter of the first order.

20. A system of claim 19, wherein said filter means includes means for operating on the following transfer function:

$$\frac{1}{1 + \frac{(TC)}{(2200)} S}$$

where TC is a time constant for said filter means, and S is a Laplace transformer in 1/seconds.

21. A system of claim 16, wherein said system further comprises second speed controller means and means for operating said second speed controller means in parallel with said impact load controller means.

22. A system of claim 16, wherein said system further comprises means for operating said first speed controller means in series with said impact load controller means.

23. A system of claim 21, wherein said first speed controller means has (PI) characteristics, and wherein said second speed controller means has (PI)² characteristics.

24. A system of claim 16, wherein said means for producing said initial signal and said sequential signals includes means for operating on the following transfer function:

$$K_g S = \frac{K_g}{T_d}(1 - Z^{-1}) = \frac{K_g}{T_d}(1 - Z^{-1}) = (GAIN)(1 - Z^{-1})$$

where S is a Laplace operator in 1/seconds, $T_d$ is an updated time unit in milliseconds for said speed regulator drive system, and $Z^{-1} = e^{-T_d S}$ and $K_g$ is a constant.

25. An impact load controller for controlling the dynamics of a drive motor whose speed is reduced from a steady state condition due to a load disturbance applied to said motor, said impact load controller comprising:
  means for producing a signal which is a function in a rate of change in a speed error, which speed error is the difference between a desired speed value and an actual speed value, and including means for producing a gain value product for said signal, and
  means for applying said signal to said drive motor to first increase said speed of said drive motor above said steady state condition and to sequentially decrease said speed of said drive motor until it reaches said steady state condition.

26. A method for controlling the dynamics of a drive motor whose speed is reduced from a steady state speed due to a load disturbance applied to said motor, the steps comprising:
  using a rate of change in speed error, which speed error is based on the difference between a desired speed value and an actual speed value,
  producing a gain value product for said rate of change in said speed error,
  combining said gain value product with at least said speed error to initially increase said speed of said drive motor above said steady state speed, and thereafter to decrease said speed of said drive motor until it reaches said steady state speed.

27. A method for compensating for a reduction in speed of a drive motor from a steady state speed due to a load disturbance applied to said drive motor, the steps comprising:
  (a) determining a speed error based on an actual speed value and a desired speed value,
  (b) determining the rate of change in said speed error,
  (c) producing a gain value product for said rate of change in said speed error,
  (d) initially increasing said gain value product to a first value by a desired factor to proportionally increase said speed of said drive motor above said steady state speed, and
  (e) after said initial increase in said speed of said motor, filtering sequentially said gain value products to exponentially decrease said speed of said drive motor until said speed reaches said steady state speed.

28. The method of claim 27, the steps further comprising:
  using a (PI) speed controller to receive said first gain value product and said sequential gain value products for regulating the speed of said drive motor.

29. The method of claim 27, the steps further comprising:
  using a (PI)² speed controller for receiving said speed error and for producing an output, and
  combining said output from said (PI)² speed controller with at least said sequential gain value products to produce a combined output which is used to regulate the speed of said drive motor.

30. The method of claim 29, the steps further comprising:
  using a (PI) speed controller to receive said combined output for said regulating of said speed of said drive motor.

31. The method of claim 27, the steps further comprising:
  using a low pass filter of the first order for said filtering step, and operating said filter on the following transfer function:

$$\frac{1}{1 + \frac{(TC)}{(2200)} S}$$

where TC is a time constant for said filter and S is a Laplace transfer in 1/seconds.

32. The method of claim 31, the steps further comprising:
  using tuning means for changing said time constant for said filter in a range from zero to 200 milliseconds.

33. The method of claim 27, the steps further comprising:
  for steps (b) and (c) using the following transfer function:

$$K_g S = \frac{K_g}{T_d}(1 - Z^{-1}) = \frac{K_g}{T_d}(1 - Z^{-1}) = (GAIN)(1 - Z^{-1})$$

where S is a Laplace operator in 1/seconds, $T_d$ is an updated time unit in milliseconds, and $Z^{-1} = e - T_d S$, and $K_g$ is a constant.

34. The method of claim 33, the steps further comprising:
  using tuning means for changing said gain value product for said rate of change in said speed error in a range from zero to fifteen milliseconds.

35. A method of claim 27, the steps further comprising:
  for step (d), using the integer two raised to a power ranging from zero to five for said desired factor.

36. In a speed regulator drive system in which the speed of a drive motor is controlled by a speed error signal, a load impact controller for compensating for reduction in speed of said drive motor from a steady state speed due to impact loads, said load impact controller comprising:

means for generating a load impact correction signal which is a step function of the rate of change of the speed error and modified to decay with time, and including means for generating a rate signal proportional to said rate of change of said speed error, and summer means for adding said load impact correction signal to said speed error signal to control the speed of said drive motor for returning said drive motor to its said steady state speed.

37. The system of claim 36, wherein said means for generating said load impact correction signal further includes:

means for multiplying said rate signal by a gain factor, low pass filter means, and means for initially selecting said rate signal multiplied by said gain factor as the load impact correction signal, and subsequently selecting said rate signal filtered by said low pass filter means as said load impact correction signal.

38. The system of claim 37, wherein said means for generating said load impact correction signal further includes means for applying said rate signal multiplied by said gain factor to said low pass filter means as an initial charge.

39. The system of claim 38, further including means for operating said means for generating said load impact correction signal only when said speed error signal rises above a first predetermined threshold.

40. The system of claim 39, wherein said means for generating said load impact correction signal drops out when said speed error signal falls below a second predetermined threshold below said first threshold.

41. The system of claim 37, including a $(PI)^2$ controller generating a $(PI)^2$ error signal as a function of said speed error signal, and wherein said summer means includes means for adding said $(PI)^2$ error signal to said speed error signal and said load impact correction signal to control said speed of said drive motor.

* * * * *

UNITED STATES PATENT AND TRADEMARK OFFICE
CERTIFICATE OF CORRECTION

PATENT NO. : 5,355,060

DATED : October 11, 1994

INVENTOR(S) : Robert S. Peterson

It is certified that error appears in the above-identified patent and that said Letters Patent is hereby corrected as shown below:

Cover page, second column, -- Suzanne Kikel, Patent Agent -- should be inserted under "*Attorney, Agent, or Firm*"

Column 8, line 67, "CRA" should be -- $CR_a$ --.

Column 9, line 13, " $\mp A$" " should be -- "A" --.

Column 11, line 7, "inn" should be -- in --.

Column 11, line 68, "inn" should be -- in --.

Signed and Sealed this

Eleventh Day of July, 1995

Attest:

BRUCE LEHMAN

*Attesting Officer*      *Commissioner of Patents and Trademarks*